United States Patent
Swahn

(10) Patent No.: US 8,015,259 B2
(45) Date of Patent: Sep. 6, 2011

(54) MULTI-WINDOW INTERNET SEARCH WITH WEBPAGE PRELOAD

(76) Inventor: Alan Earl Swahn, North Andover, MA (US)

( * ) Notice: Subject to any disclaimer, the term of this patent is extended or adjusted under 35 U.S.C. 154(b) by 1163 days.

(21) Appl. No.: 10/657,888

(22) Filed: Sep. 9, 2003

(65) Prior Publication Data

US 2004/0049541 A1    Mar. 11, 2004

Related U.S. Application Data

(60) Provisional application No. 60/409,456, filed on Sep. 10, 2002.

(51) Int. Cl.
*G06F 15/16* (2006.01)
(52) U.S. Cl. ....................................... 709/217
(58) Field of Classification Search .................... 709/217
See application file for complete search history.

(56) References Cited

U.S. PATENT DOCUMENTS

| | | | | |
|---|---|---|---|---|
| 5,867,706 | A * | 2/1999 | Martin et al. | 718/105 |
| 6,167,438 | A * | 12/2000 | Yates et al. | 709/216 |
| 6,182,122 | B1 * | 1/2001 | Berstis | 709/217 |
| 6,275,496 | B1 * | 8/2001 | Burns et al. | 370/429 |
| 6,282,567 | B1 * | 8/2001 | Finch et al. | 709/219 |
| 6,314,451 | B1 * | 11/2001 | Landsman et al. | 709/203 |
| 6,460,036 | B1 * | 10/2002 | Herz | 707/10 |
| 6,466,967 | B2 * | 10/2002 | Landsman et al. | 709/203 |
| 6,496,857 | B1 * | 12/2002 | Dustin et al. | 709/219 |
| 6,516,338 | B1 * | 2/2003 | Landsman et al. | 709/203 |
| 6,519,648 | B1 * | 2/2003 | Eyal | 709/231 |
| 6,544,295 | B1 * | 4/2003 | Bodnar | 709/219 |
| 6,571,279 | B1 * | 5/2003 | Herz et al. | 709/217 |
| 6,598,072 | B1 * | 7/2003 | McBrearty et al. | 709/203 |
| 6,687,737 | B2 * | 2/2004 | Landsman et al. | 709/203 |
| 6,742,033 | B1 * | 5/2004 | Smith et al. | 709/224 |
| 6,801,227 | B2 * | 10/2004 | Bocionek et al. | 715/777 |
| 6,880,123 | B1 * | 4/2005 | Landsman et al. | 715/500.1 |
| 6,917,960 | B1 * | 7/2005 | Decasper et al. | 709/203 |
| 6,947,924 | B2 * | 9/2005 | Bates et al. | 707/3 |
| 6,990,494 | B2 * | 1/2006 | Bates et al. | 1/1 |
| 7,386,134 | B2 * | 6/2008 | Engelsberg et al. | 381/77 |
| 2001/0054089 | A1 * | 12/2001 | Tso et al. | 709/219 |

(Continued)

OTHER PUBLICATIONS

The Mozilla Organization, Mozilla 0.9.5 Release Notes, Oct. 25, 2001, p. 2.* Microsoft, Microsoft Accessibility Update Newsletter, Oct. 2001.*

*Primary Examiner* — Aaron Strange
*Assistant Examiner* — Brian P Whipple
(74) *Attorney, Agent, or Firm* — Cherskov & Flaynik

(57) ABSTRACT

Methods are described to preload a plurality of webpages from a hyperlink list either previously saved or returned by one or more search engines, where said webpages are displayed on demand in a web browser. The web browser has been augmented to display multiple webpages simultaneously and to allow changing the number of webpages displayed. Any displayed portion of this plurality of webpages can be captured to a standard graphics format for later use. The viewing magnification factor can be changed for this plurality of webpages both globally for preloaded webpages not displayed and selectively for displayed webpages. The hyperlinks associated with any portion of this plurality of webpages can be saved as a list of hyperlinks (group bookmark) for later retrieval. A queue of favorite webpages can be dynamically created from this plurality of webpages by selecting one or more webpages and having the associated hyperlinks to said selected webpages appended to a queue of hyperlinks which is available for preloading, display, or saved as a group bookmark.

18 Claims, 27 Drawing Sheets

U.S. PATENT DOCUMENTS

| | | |
|---|---|---|
| 2002/0023153 A1* | 2/2002 | Park .............................. 709/224 |
| 2002/0052929 A1* | 5/2002 | Walker et al. ................. 709/218 |
| 2003/0014501 A1* | 1/2003 | Golding et al. ............... 709/218 |
| 2003/0120779 A1* | 6/2003 | Rodefer et al. ............... 709/225 |
| 2004/0143564 A1* | 7/2004 | Gross et al. ....................... 707/1 |
| 2006/0218479 A1* | 9/2006 | Torres ........................... 715/500 |
| 2006/0288124 A1* | 12/2006 | Kraft et al. .................... 709/246 |
| 2010/0030894 A1* | 2/2010 | Cancel et al. ................. 709/224 |

* cited by examiner

MULTI-WINDOW INTERNET SEARCH WITH WEBPAGE PRELOAD

CROSS REFERENCE TO RELATED APPLICATIONS AND DISCLOSURES

This application claims the benefit of U.S. Provisional Application, Application No. 60/409,456, filed on Sep. 10, 2002, and entitled "Information retrieval and display system", commonly assigned with the present invention and incorporated herein by reference.

FIELD OF THE INVENTION

This invention, hereinafter referred to as "IRDS" relates to
(i) Information Retrieval and Display Systems in a networked communications environment;
(ii) the operation of web browsers; and
(iii) the operation of search engines.

The networked communications environment ("Network") may include Wide Area Networks (WANs), Metropolitan Area Networks (MANs), Local Area Networks (LANs), wired and wireless systems that permit multiple computers to communicate utilizing a set of protocols, such as Transmission Control Protocol/Internet Protocol (TCP/IP) and Hypertext Transfer Protocol (HTTP), in an Internet, Intranet, or Extranet environment.

BACKGROUND

Web browsers include but are not limited to Internet Explorer, Netscape Navigator, Mozilla, Opera, Konqueror, and Galeon. Web browsers are the standard for viewing website information. Web browsers have differentiated themselves by computer operating system support (such as Apple, Microsoft Windows, and Unix), webpage download speed, computer memory usage, and compliance to standards. Most web browsers are also capable of uploading and downloading files, but this competes with well-established file transfer protocol (FTP) programs in this particular arena. Some web browsers have the capability to call other programs depending on context, such as opening a media player to play a music file, after downloading the music file from a Network. Called programs may permanently reside on a local computer's physical media, but may sometimes be (i) loaded across a Network and executed locally or (ii) executed on a different computer.

Some web browsers have a loosely integrated search capability, such as Microsoft's Internet Explorer. The user may enter the search topic and constraints into the web browser display and subsequently execute a search. The web browser calls a search engine across a Network to execute a search on a different computer and displays the resulting hyperlinks to webpages in a prioritized order on the local computer. A list of text hyperlinks, that may have an associated description in the vicinity of the hyperlink, is usually displayed in one panel of the web browser. A second panel sometimes holds static images with hyperlinks that may have
(i) an associated text hyperlink repeated in the vicinity of each image; and/or
(ii) an associated description in the vicinity of each image.

These images, when present, are simple thumbnail images with hyperlinks to an associated webpage. The thumbnail images are very small and tiled in the panel. Their small size makes it difficult to obtain much useful information from the picture alone. U.S. Pat. No. 6,271,840 B1 dated Aug. 7, 2001 to inventors James Lee Finseth and Jerry Hermel and Bryan F. Pelz entitled "Graphical Search Engine Visual Index" describes a visual index method that provides graphical output from search engine results or other URL lists. The graphical information and other media information is rendered into a reduced graphical form for review by a user. The reduced graphical form is sometimes useful for discerning graphical and/or textual information when not much detail is required, but it is difficult to use a reduced graphical form when detailed graphical and/or textual information is required, similar to the thumbnail images described in the foregoing.

Web browsers that don't have a loosely integrated search function, rely on search engine websites to provide the user interface to perform a search. Search engine websites generally display their results in one main viewing area of a web browser, and optionally display a list of
(i) text hyperlinks; or
(ii) static images with hyperlinks that may have the associated text hyperlink repeated in the vicinity of each image and an associated description in the vicinity of each image.

Again, these images, when present, are simple thumbnail images with hyperlinks to an associated website. As this method is web browser independent and has been available for many years, it is the most widely used search technique.

Web browsers have the ability to display a webpage that contains information from multiple sources on a Network. A webpage points to such information through hyperlinks, designated Uniform Resource Identifiers (URIs) or informally as Uniform Resource Locators (URLs). URIs are short strings that identify resources on a Network, including but not limited to documents, images, services, downloadable files, webpages, and electronic mailboxes. When loading a webpage, a web browser uses the URIs to locate, load and display information residing on a Network. In some cases, the web browser may take additional actions, such as asking for a username/password or loading another program(s) to interpret the information.

The information from these multiple Network sources can be divided up into independent web browser viewing areas, called Frames. Frames are usually used to manage complexity and information from a particular website. A common use for Frames is to divide the web browser viewing area into categories of information, such as keeping the menu system in one area, advertisements in a second area, and main website content in a third area. Not all websites use Frames and not all web browsers support Frames. It is possible to subjugate multiple websites and their respective webpages within a website's webpage(s). Such subjugation is usually done when the information is closely related between such websites and/or a relationship exists between the website owners.

Even though a website may subjugate another related website's webpages through mechanisms such as Frames discussed in the foregoing, web browsers do not generally display and operate on multiple independent websites at one time. Information related to a particular search topic, may be scattered on multiple independent websites. Web browsers and search engines, do not coalesce pertinent webpages, as opposed to hyperlinks, and simultaneously display multiple webpages. This inability greatly impedes information search, retrieval, and viewing processes given current levels of processor power and Internet connection bandwidth. To display and/or operate on more than one webpage at a time and have the search capabilities that users have become accustomed to would require enhancements to the web browser and tight integration of the web browser and search engine control functions—something that has not been done to date.

Every website has its own latency in responding to a web browser, such that the web browser can download the webpage and render the webpage in the display. Hence the time to review multiple website webpages includes each website's response time, the Network latency at a given time, and the time to select the next hyperlink (collectively "Latency"). Web browsers are currently limited to downloading only one webpage at a time. Even with simultaneous multiple Network connections to such a webpage, the Latency to review multiple webpages or websites is additive and arbitrarily limited by the webpages that, for whatever reason, are slow to retrieve. U.S. Pat. No. 6,067,565 dated May 23, 2000 to inventor Eric Horvitz entitled "Technique For Prefetching A Web Page Of Potential Future Interest In Lieu Of Continuing A Current Information Download" describes prefetching webpages or pre-selected portions thereof, into a local cache of a client computer. This prefetching technique uses a probabilistic user model, which specifies, at any one time, those pages or portions of pages that are likely to be prefetched given, e.g., a webpage currently being rendered to a user; these pages being those which promise to provide the largest benefit (expected utility) to the user. This approach has little utility when used in conjunction with a conventional search engine, where a user gives search criteria to a search engine and such search engine returns a ranked ordered hyperlink list corresponding to webpages based on the user's criteria. The search engine has already calculated the rank order for the hyperlinks before returning said hyperlink list to the user's web browser. It is unnecessary to further apply a probabilistic or statistical user model to said web page containing said hyperlink list, as the hyperlink list is already ranked ordered. A preloading scheme that preloaded the ranked ordered hyperlinks directly into a web browser for later display would have much greater utility to lower the latency to review such webpages and more efficiently use the associated network and computer resources. Similarly, U.S. Pat. No. 6,085,226 dated Jul. 4, 2000 to inventor Eric Horvitz entitled "Method And Apparatus For Utility-Directed Prefetching Of Web Pages Into A Local Cache Using Continual Computation And User Models" describes prefetching webpages or pre-selected portions thereof, into a local cache of a client computer. This prefetching technique uses a probabilistic user model to specify, at any one time, those pages or portions of pages, that are likely to be prefetched given, e.g., a webpage currently being rendered to a user, which promises to provide the largest benefit (expected utility) to the user. Again, this approach has little utility when used in conjunction with a conventional search engine, where a user gives search criteria to a search engine and such search engine returns a ranked ordered hyperlink list corresponding to webpages based on the user's criteria. The search engine has already calculated the rank order for the hyperlinks before returning said hyperlink list to the user's web browser. It is unnecessary to further apply a probabilistic or statistical user model to said web page containing said hyperlink list, as the hyperlink list is already ranked ordered. A preloading scheme that preloaded the ranked ordered hyperlinks directly into a web browser for later display would have much greater utility to lower the latency to review such webpages and more efficiently use the associated network and computer resources. Similarly, U.S. Pat. No. 6,182,133 B1 dated Jan. 30, 2001 to inventor Eric Horvitz entitled "Method And Apparatus For Display Of Information Prefetching And Cache Status Having Variable Visual Indication Based On A Period Of Time Since Prefetching" describes prefetching webpages or portions thereof and subsequently making a visual indication to a user that such pages or portions have been prefetched. This prefetching technique uses a probabilistic or statistical user model to specify, at any one time, those pages that are to be prefetched given information, e.g., a webpage currently being rendered to a user, content and structure of that particular page, a history of webpages visited by the user, user background, and user actions. Again, this approach has little utility when used in conjunction with a conventional search engine, where a user gives search criteria to a search engine and such search engine returns a ranked ordered hyperlink list corresponding to webpages based on the user's criteria. The search engine has already calculated the rank order for the hyperlinks before returning said hyperlink list to the user's web browser. It is unnecessary to further apply a probabilistic or statistical user model to said web page containing said hyperlink list, as the hyperlink list is already ranked ordered. A preloading scheme that preloaded the ranked ordered hyperlinks directly into a web browser for later display would have much greater utility to lower the latency to review such webpages and more efficiently use the associated network and computer resources.

In reviewing webpage information, it is often difficult to copy and paste information accurately into other applications or even print such information. The capability to select any portion of the web browser display and generate an image in a selected format that can be saved to a physical media such as hard drive, floppy drive, compact disk or computer memory—such as the Microsoft Windows clipboard, is not incorporated in web browsers today.

Websites frequently have webpages that include fonts and images that are small and difficult to read. Web browsers don't have a zoom capability to enlarge a viewing area or make it smaller, thereby rendering such information that may be too small or too large useless, if it can't be dynamically enlarged or made smaller respectively.

Web browsers have very limited functionality to enhance the viewing and processing of information, but do usually include the capability to (i) list and select hyperlinks to webpages associated with the history of the websites previously visited; and (ii) select and save favorite hyperlinks to website webpages, one at a time. Web browsers don't have the capability to remove or prune one or more hyperlinks from a hyperlink list returned by a search engine(s) or save, for future retrieval, a complete hyperlink list or pruned hyperlink list returned by a search engine(s).

There also isn't a capability to save a hyperlink list or pruned hyperlink list to an alternate list or queue for later review or saving, while possibly continuing on with a new search that may entail different subject matter, options, constraints, or search engine(s).

Common search engines include, but are not limited to Google, Yahoo!, AltaVista, Lycos, Webcrawler, Excite, Northern Light, MSN Search, iWon, HotBot, AlltheWeb, Teoma, DMOZ, DOGPILE, WizeNut, Overture, AOL, Ask Jeeves, Inktomi, LookSmart, and Netscape. Search engines differentiate themselves mainly on content and features. The size of the search engine database is one of the content metrics. Search engines may return lists of hyperlinks that specialize in a content area such as: news, music files, auctions, employment, insurance, loans, yellow pages, white pages, email addresses, sports, shopping, movies, classifieds, health, images, movies, home life, finance, stocks, and travel. Search features may include: language selection, word exclusion, exact phrases to be returned, number of pages to be returned, file format, returning results from a specific website domain, and content blocks. Some search engines are website domain specific such as Dell, GM, and Sears and are accessed from their respective websites. Conventional search engines return one or more lists of text hyperlinks and/or images with hyperlinks, not the fully active webpages associated with the hyperlinks.

Utilizing a search engine website is a serial process of browsing to such website; entering the search topic, options and constraints; executing the search; a list of hyperlinks (usually a set of ten (10) at one time) is returned by the search engine and displayed by the web browser; selecting a single hyperlink from the list; being vectored to the associated website; reviewing the webpage information that resides on the website in the web browser; and returning to the search engine website to select another hyperlink. This process is repeated for each such successive hyperlink. To view the next set (usually ten) of hyperlinks requires selecting yet a different hyperlink to render the next set of hyperlinks in the web browser. This laborious ping-pong process between websites and the search engine hyperlink list is continued until the sought after information is found or the search is terminated.

There are multiple inherent problems in using a prior art web browser-search engine paradigm for information retrieval and display, stemming from an age where Network and Internet bandwidth was limited and costly. Better solutions are needed that remove the foregoing web browser and search engine deficiencies, given the greater processor power measured in millions of instructions per second (MIPS) and Internet access bandwidth measured in millions of bits per second (Mbits/sec.) available today, while providing a tighter integration between the web browser and search engine(s).

SUMMARY

IRDS enhancements are described that enable search, display, and review of Network based information to become a fast efficient process. An IRDS based solution includes web browser enhancements and enhancements only achieved in combination with a search engine and web browser.

An embodiment of IRDS may include, but is not limited to: a stand-alone computer application program; integration into a web browser; or an add-on to a conventional web browser such as, Microsoft's Internet Explorer and Netscape's Navigator. An add-on may take the form of
  (i) an applet;
  (ii) a web browser plugin; or
  (iii) a computer program that interfaces to a web browser through an application-programming interface (API) or proprietary interface.

IRDS enhancements to a web browser in combination with one or more search engines permits the search topic, options and constraints to be sent to one or more search engines without browsing to the search engine website(s). Each search engine has its own limited grammar that controls each search, which can be sent to a search engine across a Network. For example, searching for classic cars with webpages in German or Polish and requesting fifty (50) pages to be returned, starting with the twenty-first webpage utilizing the Google search engine, would entail sending the search engine a string of information in a grammar that it recognizes such as:
  "http://www.google.com/search?q=classic+cars&num=50&hl=en&lr=lang_de|lang_pl&ie=UTF-8&oe=UTF-8&start20&sa=N".

Here the "q=classic+cars" represents the search topic "classic cars", with the languages German or Polish specified by "lr=lang_de|lang_pl", and the starting webpage of twenty-one is specified by "start=20" and fifty pages to be returned are specified by "num=50".

This string could be typed into a web browser with the resulting hyperlink list directly displayed in a web browser without browsing to the search engine website first. This string of information could also be sent from an IRDS enhanced web browser, where search topic, options and constraints are entered and/or selected by the user. Such an enhanced web browser dynamically builds the string in the correct grammar for one or more search engines and passes the string to each selected search engine through the Network. Each search engine processes the request and returns a webpage that contains a list of hyperlinks and/or images with hyperlinks. These webpages when communicated back to the enhanced web browser are in a binary format representing text. This format can be used to reconstruct a list of hyperlinks. The lists of hyperlinks returned from one or more search engines can be aggregated and/or prioritized by such web browser. The enhanced web browser may then use the hyperlinks to preload a number of the associated webpages concurrently ("Concurrent Webpage Preloading") and display a selected number for review. The webpages may be from the same website domain and/or differing website domains. The selectable number of webpages to load concurrently will depend on the Network bandwidth, how much computer memory is available, and to a smaller degree, computer-processing power.

Other fields could also use the concept of Concurrent Webpage Preloading to enhance performance, such as web robots. Computer programs called by various names including web robots and spiders, capture data that database centric programs like search engines and bulk email programs utilize. These robots scour the web for data by contacting website webpages and cataloging information such as a website description, title, email addresses, and/or keywords. By using Concurrent Webpage Preloading these robots would be able to contact and catalog many website webpages at the same time. This would enable better use of available Network bandwidth and reduce the time to visit target websites and update an ongoing catalog.

In addition to Concurrent Webpage Preloading, one or more look-ahead webpage preloading mechanisms can be provided for the remaining unloaded webpages, to ensure a near instantaneous webpage review experience. Such mechanisms can include a look-ahead
  (i) next-in-queue webpage preloading method ("Next-In-Queue Webpage Preloading");
  (ii) periodic webpage preloading method ("Periodic Webpage Preloading"); and/or
  (iii) descendant webpage preloading method ("Descendant Webpage Preloading").

Next-In-Queue Webpage Preloading refers to a method that preloads a selectable number of webpages pointed to by hyperlinks in a hyperlink queue that haven't been previously preloaded by other methods including Concurrent Webpage Preloading, Periodic Webpage Preloading, and Descendant Webpage Preloading. While one or more webpages are being displayed in a web browser, these webpages can be preloaded and subsequently displayed in a web browser on demand.

Periodic Webpage Preloading refers to a method whereby the webpage queue is scanned periodically for unloaded webpages. Upon finding empty locations, one or more webpages are preloaded into a webpage queue, which may then be subsequently displayed in a web browser on demand. Unloaded webpages may be selectively preloaded depending on which webpages are currently displayed, user preferences and/or other criteria, hence the preloading order is not required to be sequential.

Parent webpages referred to by a list or set of hyperlinks may contain hyperlinks that point to other children webpages, which in turn may contain hyperlinks that point to other webpages (grandchildren of the parent webpages), in perpetuity, collectively referred to as "Descendants". Descendant Webpage Preloading refers to a method that preloads selected Descendants. Any such Descendants would be visible in a web browser on demand. A selectable limit on the number of Descendants or generation of Descendants to preload may be provided, as the number of possible webpages to preload rises quickly with each additional parent webpage.

Other IRDS enhancements that improve a web browser in a search and multiple webpage display context include
  (i) finding and highlighting the search topic within one or more displayed webpages;
  (ii) bookmarking selected webpages or all the webpages as a list of hyperlinks that can be later recalled and used to preload the associated webpages into a webpage queue for web browser display on demand;
  (iii) deleting selected webpages in a list, queue, or web browser history thereby pruning the list or set of webpages;
  (iv) saving any or all of the webpages in a webpage queue to an alternate webpage set or queue for recall at a later time, while allowing a new search to commence that may entail different subject matter, constraints, or search engines; and
  (v) displaying search statistics, the webpage index being viewed, highest webpage index preloaded, Network bandwidth, memory usage, and/or processor usage statistics.

IRDS enhancements to a web browser enable
  (i) a web browser to display one or more fully active webpages simultaneously;
  (ii) a web browser individual operation on any webpage or simultaneous operation on multiple webpages;
  (iii) zoom in or out on any displayed webpage or webpages;
  (iv) changing the number of webpages displayed;
  (v) displaying the next webpage or next set of webpages depending on the number of webpages being displayed at a given time;
  (vi) displaying any selected webpage or any set of webpages depending on the number of pages displayed at a given time; and
  (vii) creating an image of any portion of the web browser display screen on demand and saving it to selected media or computer memory.

IRDS enhancements capitalize on the availability of
  (i) high bandwidth networks, such as broadband cable networks rated at up to 1.5 Mbits/sec. and Digital Subscriber Line (DSL) networks rated at up to 1.5 Mbits/sec.;
  (ii) multithreaded computer architectures;
  (iii) large inexpensive computer memory storage; and
  (iv) fast computer instruction processing, such as the Intel Pentium 4 rated at ~1700 MIPS for a clock speed of 1.5 GHz.

BRIEF DESCRIPTION OF THE DRAWINGS

The present invention is described with respect to particular exemplary embodiments thereof and reference is accordingly made to the drawings in which.

After directing the web browser to preload such webpages, the unmarked hyperlinks are marked as loaded and the function waits a specified period of time before rescanning the hyperlink queue and repeating the process.

Figure 19:
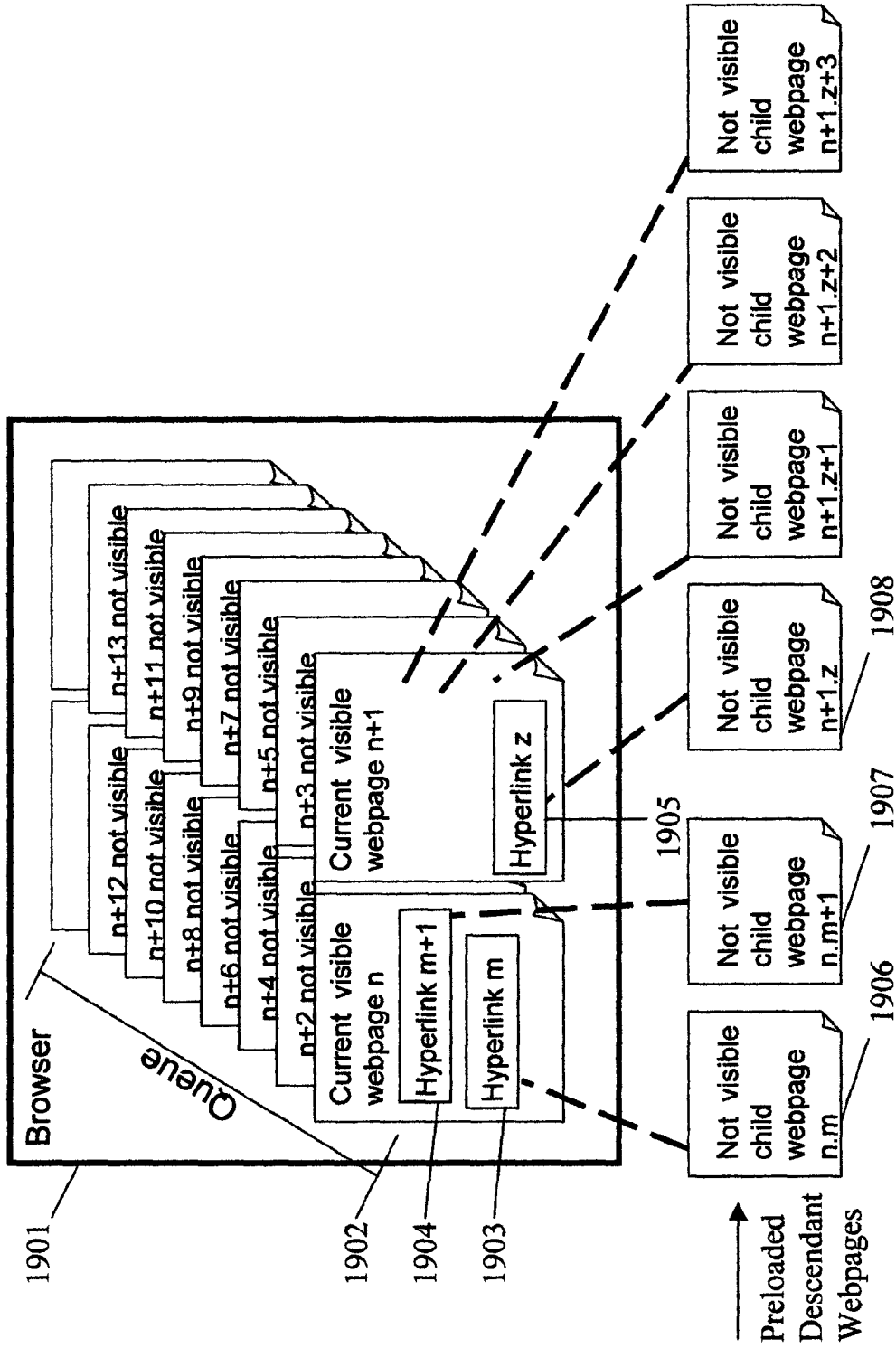

FIG. 19 depicts an IRDS directed, web browser look-ahead Descendant Webpage Preloading, where the descendant webpages pointed to by hyperlinks that reside on webpages that have already been preloaded into a webpage queue or computer memory, whether or not visible, are preloaded into a webpage queue, computer memory, or other web browser object. These descendant webpages are not visible until requested by the web browser to be displayed on demand. A user selecting a hyperlink on a visible webpage would immediately have the webpage associated with such hyperlink available on demand and made visible in the web browser display.

Figure 20:
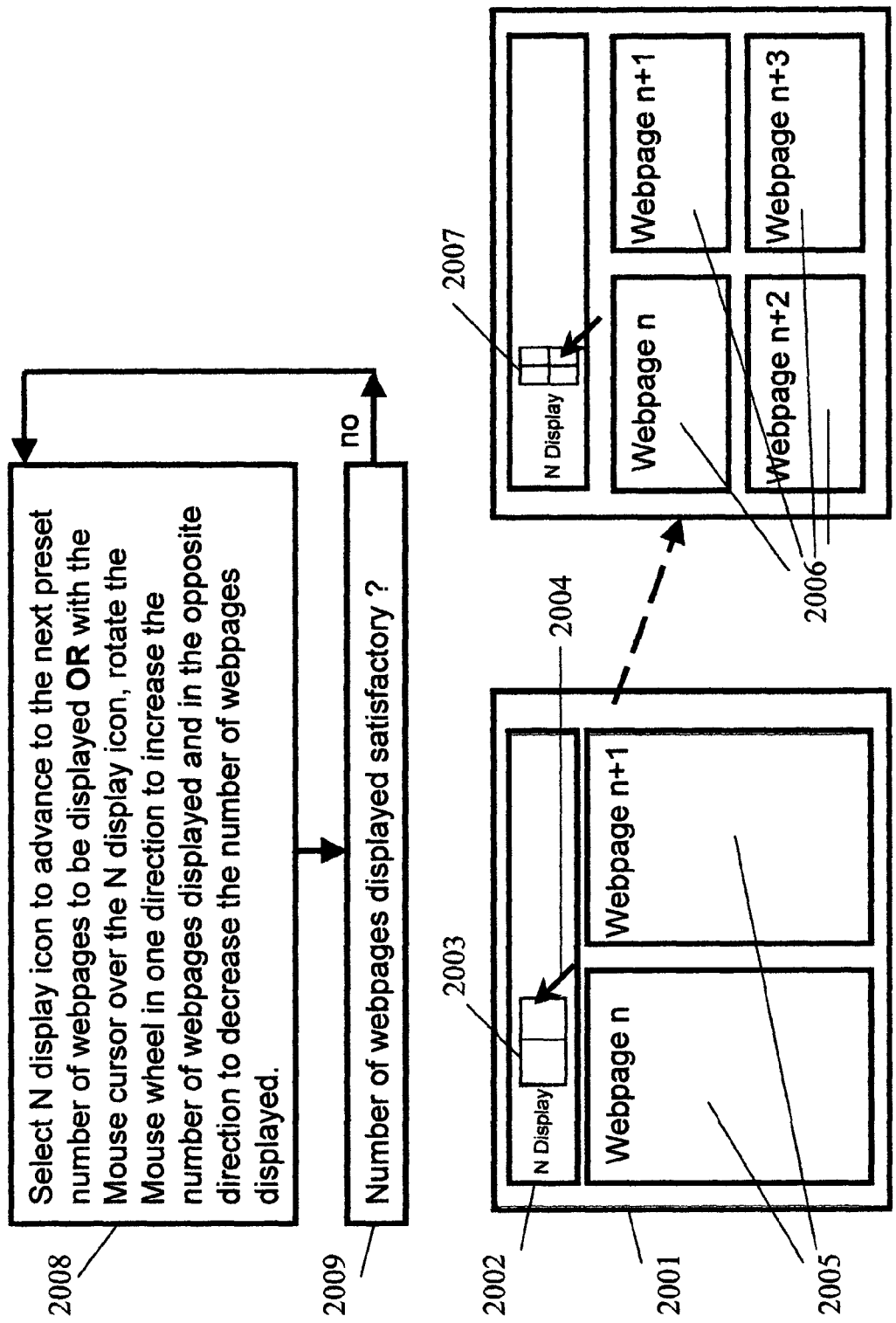

FIG. 20 shows a flowchart and diagram associated with selecting the number of webpages to display at a given time.

Figure 21:
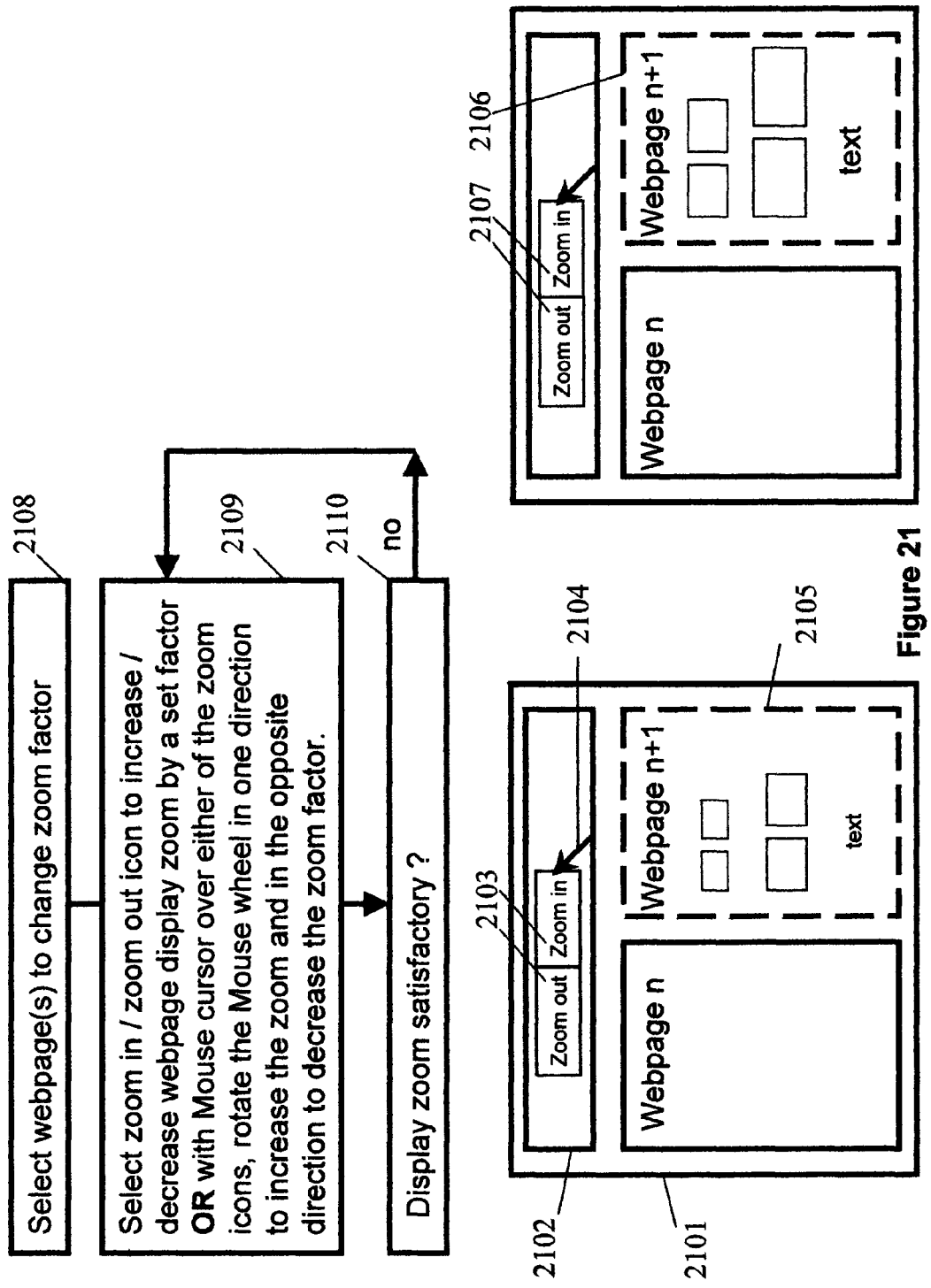

FIG. 21 shows a flowchart and diagram associated with selecting a webpage(s) in a multi-page web browser display and changing the zoom factor for a selected webpage(s).

Figure 22:
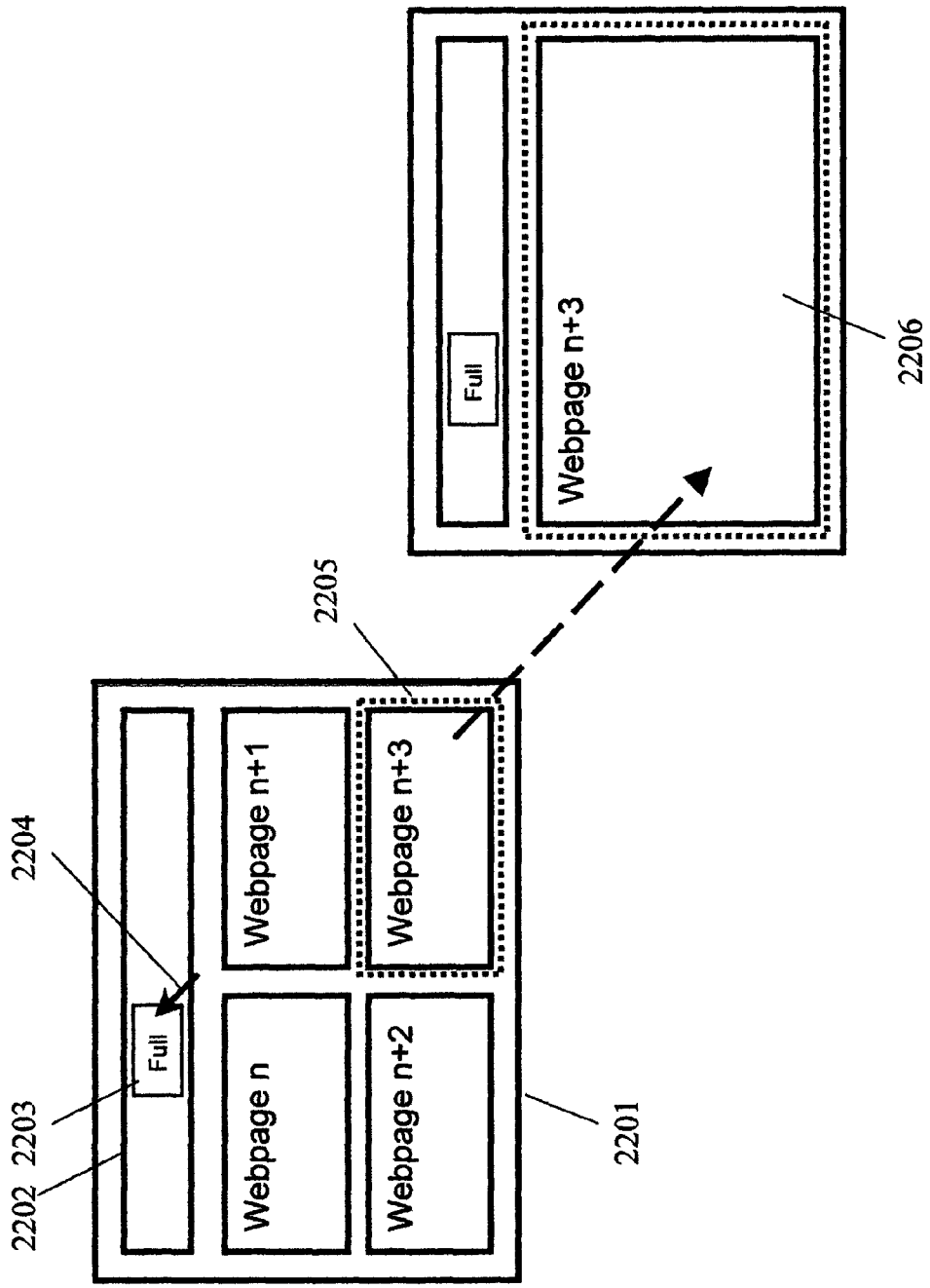

FIG. 22 shows a diagram associated with selecting a webpage in a multi-page web browser display and making the selected webpage encompass the entire screen area allotted for the multi-page display, which is equivalent to setting the number of webpages to display to one.

Figure 23:
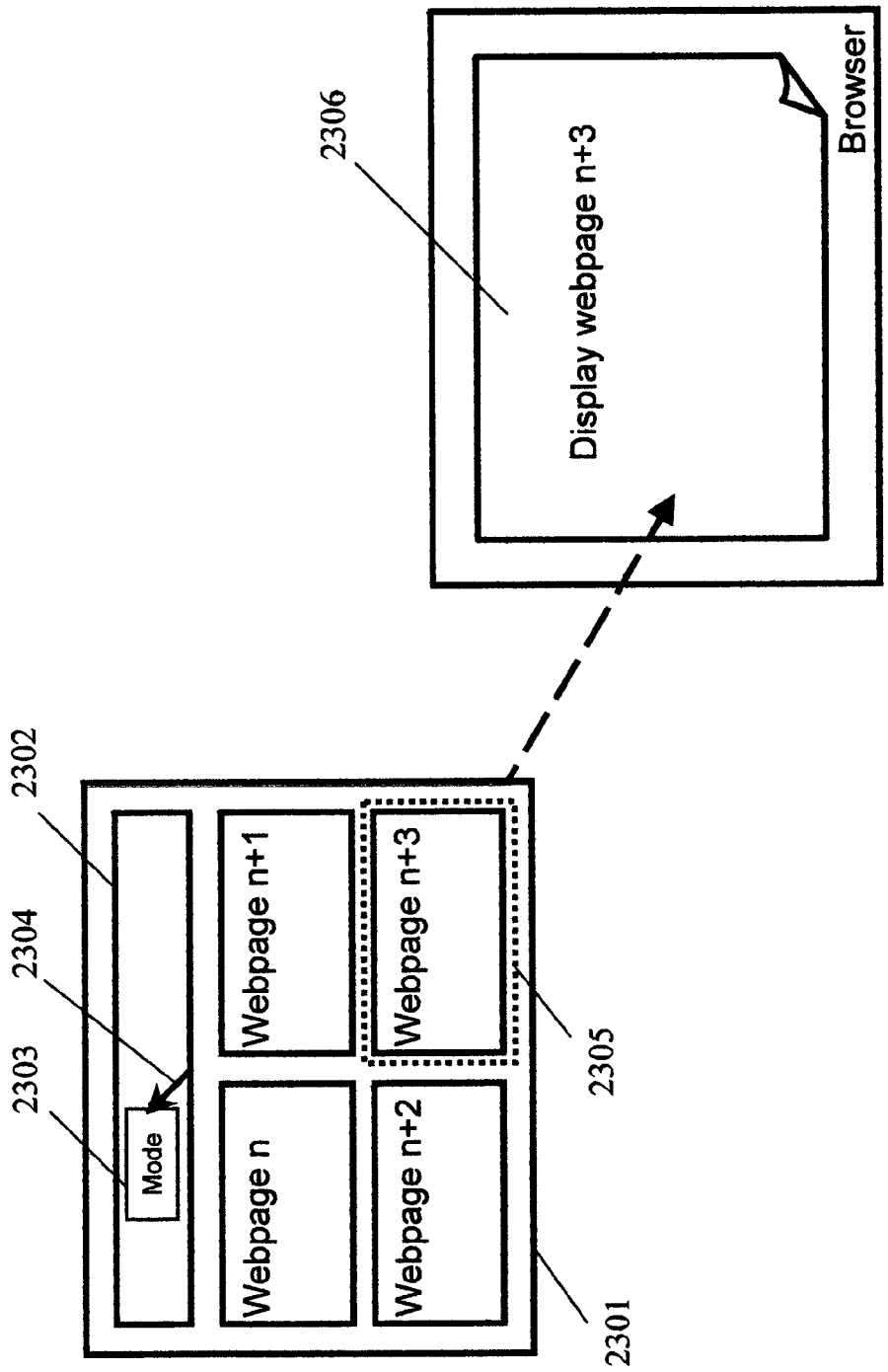

FIG. 23 shows a diagram associated with changing from an IRDS enhanced web browser mode to a conventional web browser mode for a selected webpage.

Figure 24:
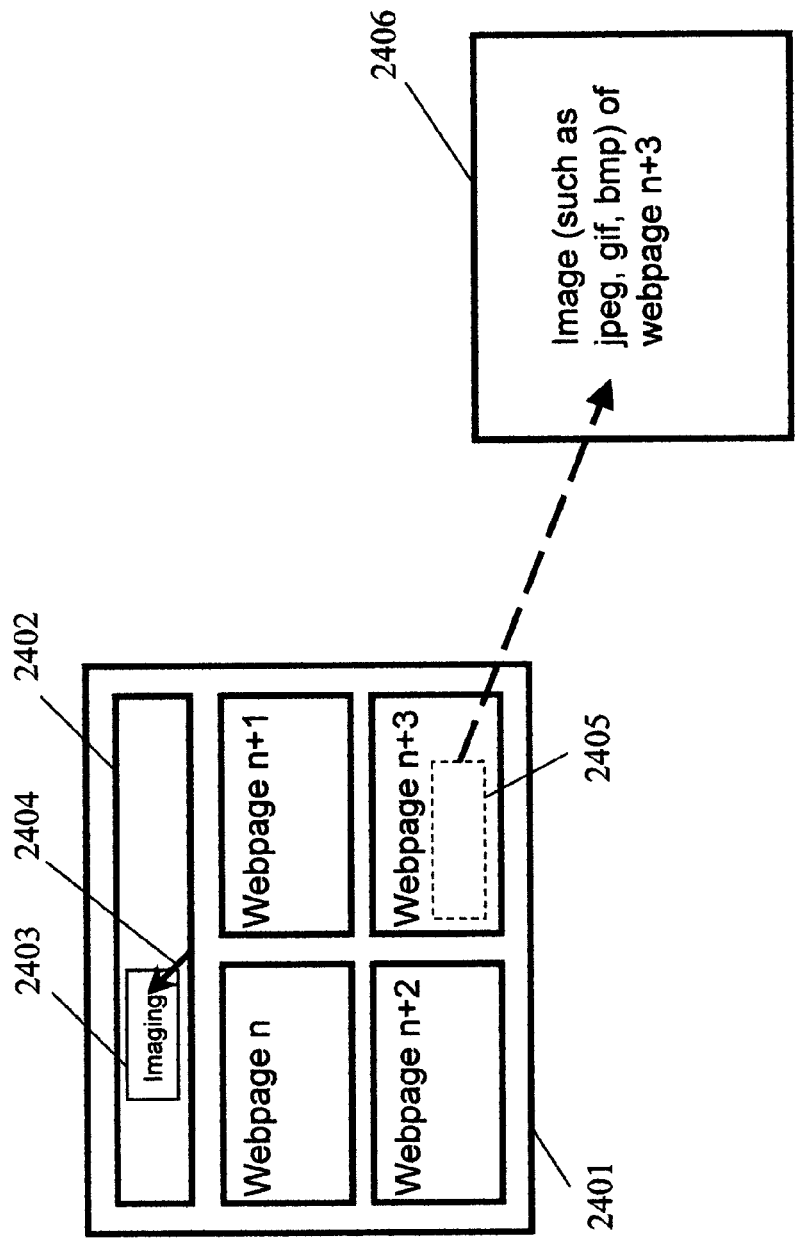

FIG. 24 shows a diagram associated with selecting any portion of a web browser display and creating an image in a standard image format, such as Joint Photography Experts Group ("JPEG"), Graphics Interchange Format ("GIF"), or bitmapped ("BMP") that can be saved to physical media (hard drive, floppy drive, compact disk, etc) or computer memory or copied to another computer application, such as a word processor, spread sheet, or presentation program.

Figure 25:
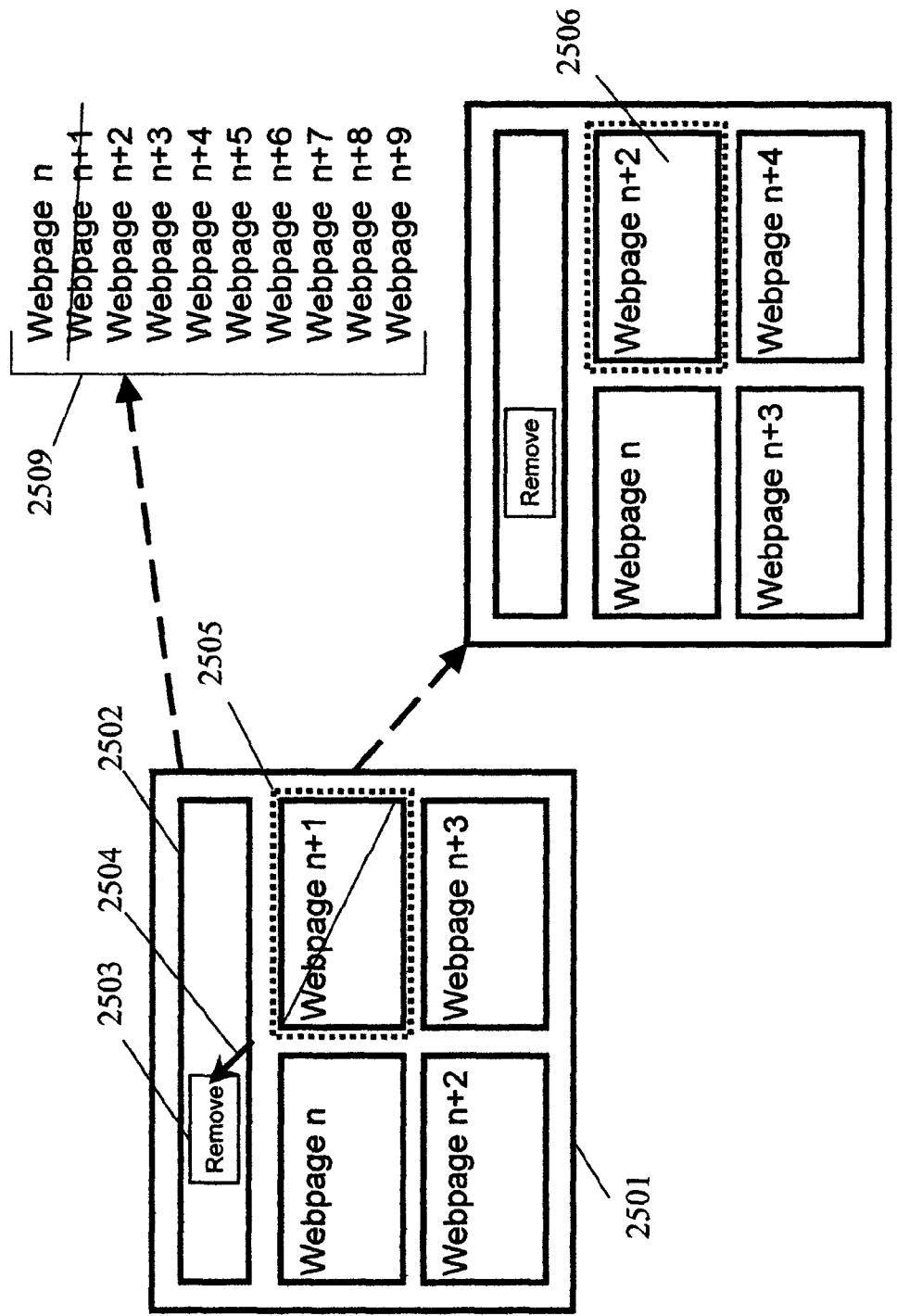

FIG. 25 shows a diagram associated with removing the selected webpages from the multi-page web browser display and/or webpage queue and/or the associated hyperlinks from the hyperlink queue.

Figure 26:
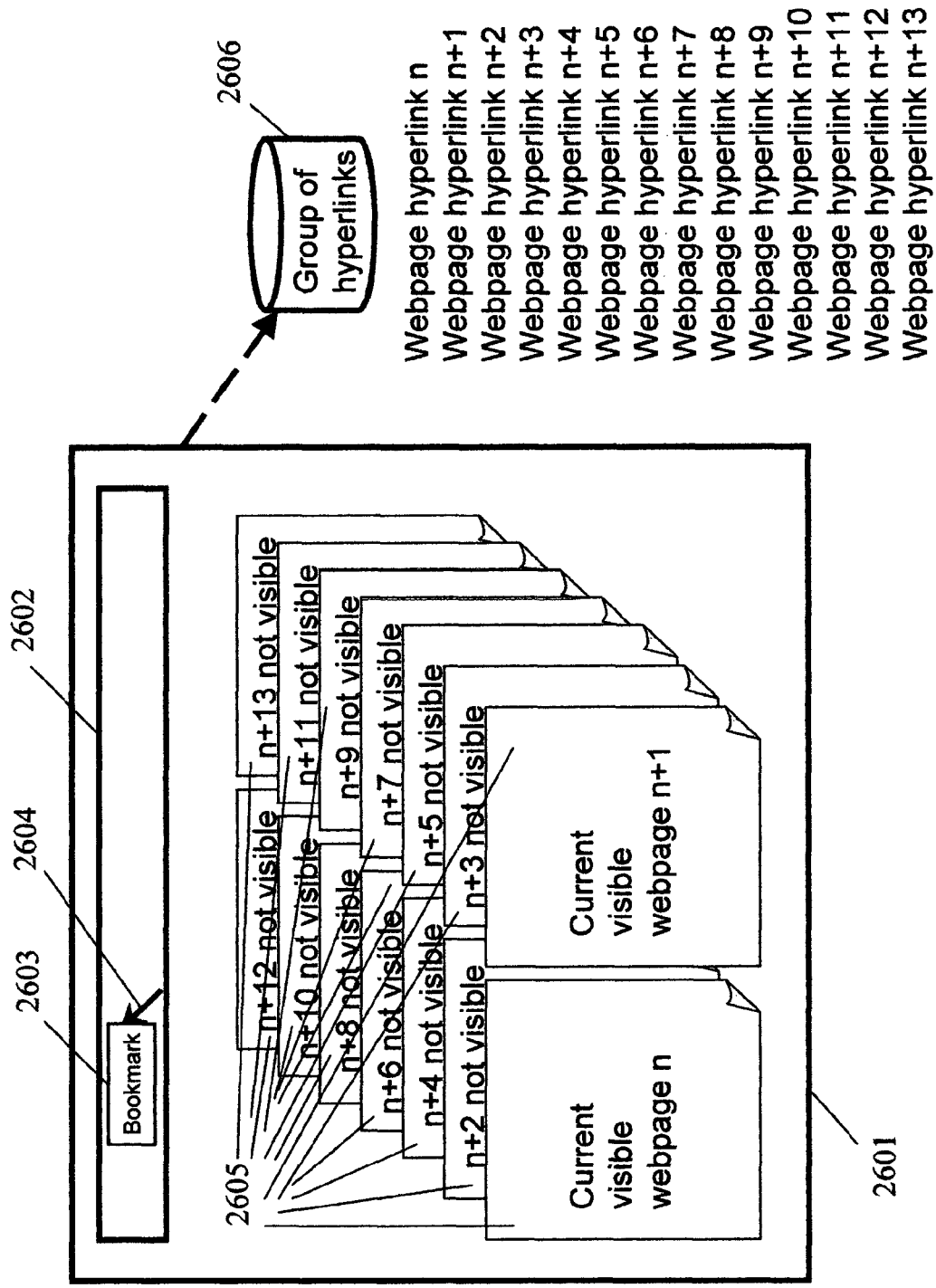

FIG. 26 shows a diagram associated with group bookmarking a selected set of hyperlinks, where such set of hyperlinks can be recalled later and used to preload the webpages pointed to by such hyperlinks into a webpage queue and subsequently displayed by a web browser upon demand.

Figure 27:
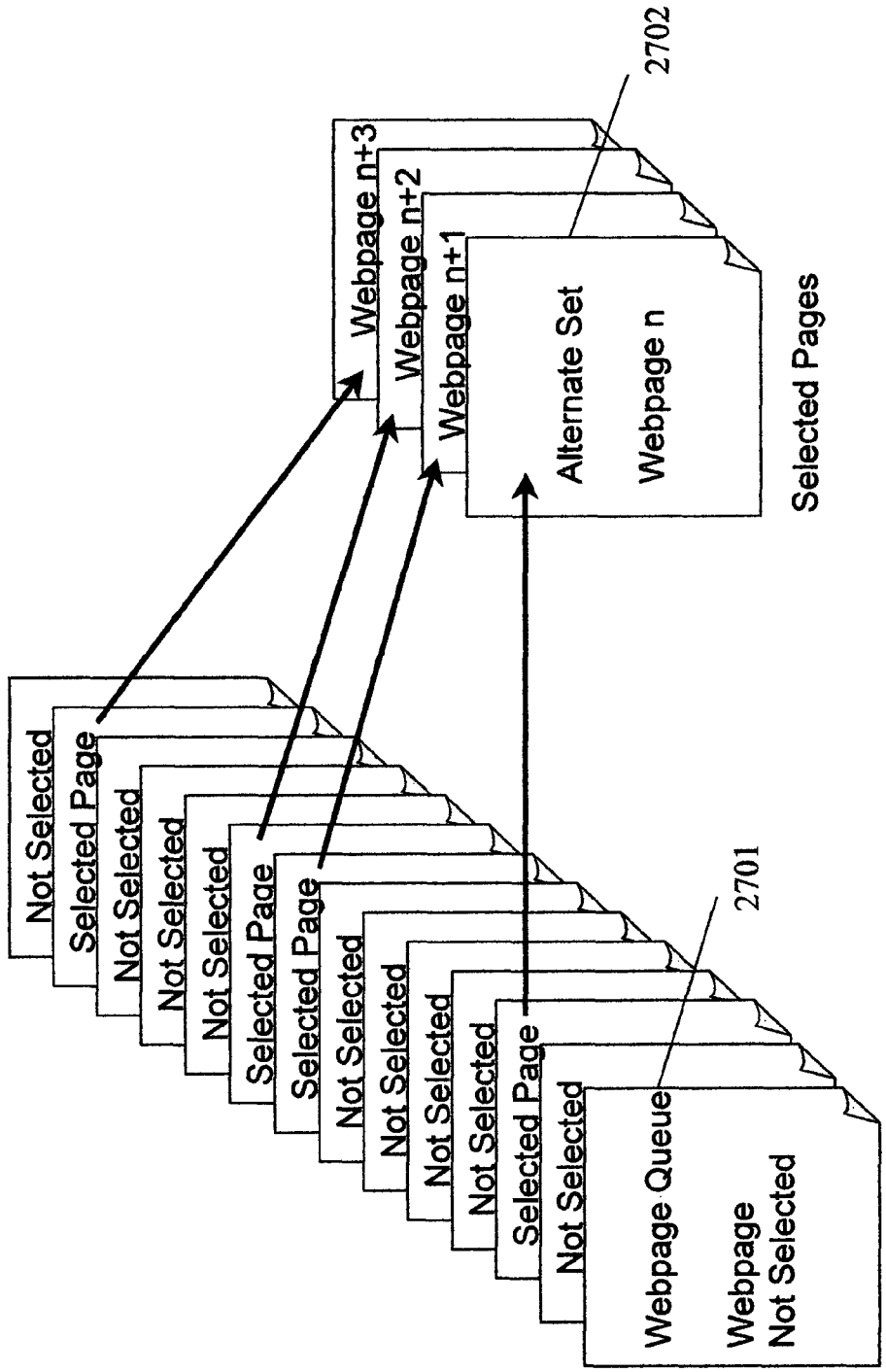

FIG. 27 shows a diagram associated with selecting any portion of a webpage queue, whether or not displayed by a web browser and saving such webpages to an alternate webpage set or queue. One or more such alternate sets could be made the active display set upon demand.

DETAILED DESCRIPTION OF THE INVENTION

Figure 1:
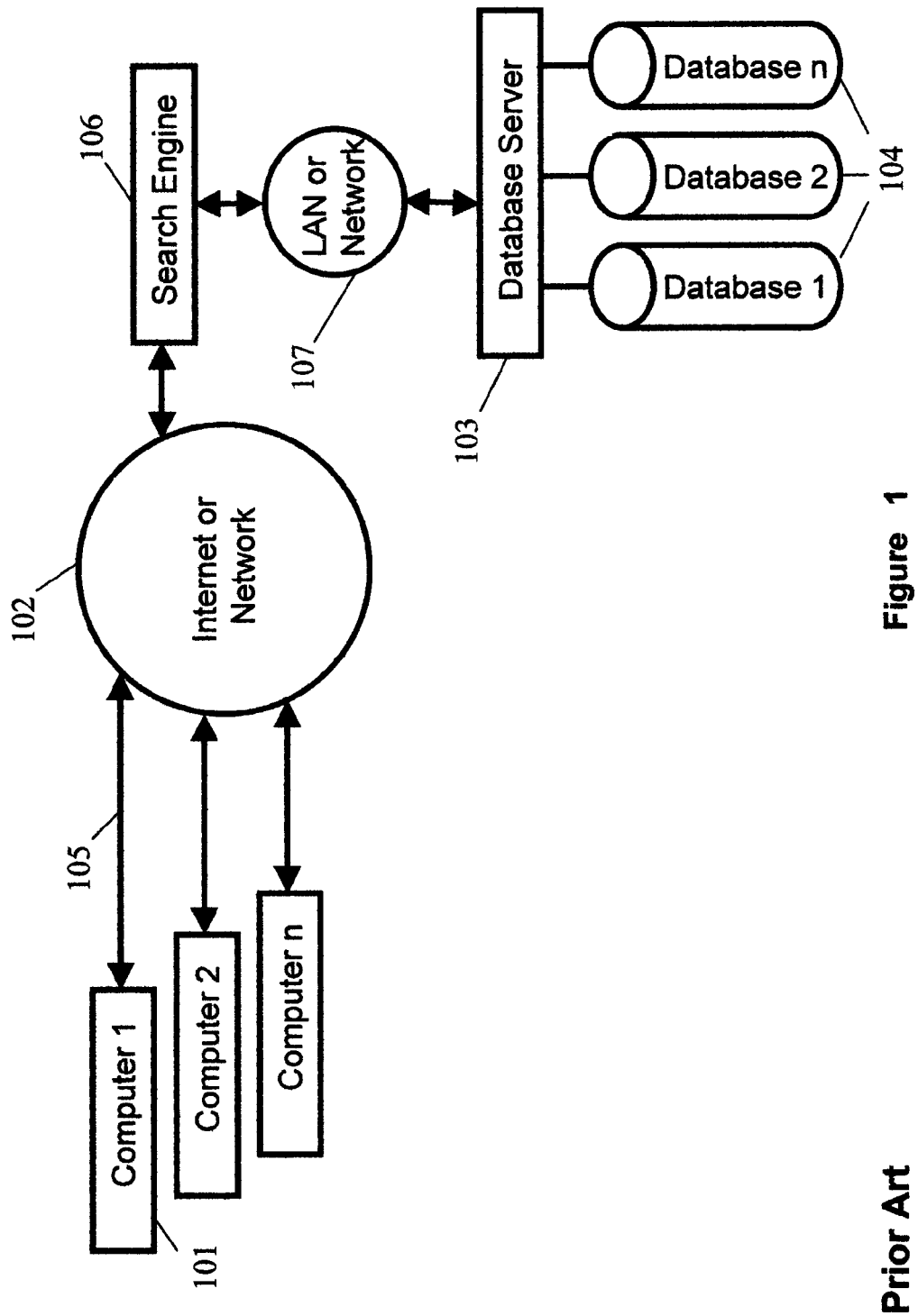
FIG. 1 shows a distributed Network environment for a conventional information search, utilizing a web browser on a computer and a search engine.

FIG. 1 shows a distributed Network environment for a conventional information search utilizing a search engine and web browser on a computer. Here, a computer 101 including a local web browser, is attached to the Internet 102 or possibly a more generalized Network through a physical link 105. The physical link 105 may be wired, wireless, or an optical link. The search engine contacted by the web browser is usually on another computer 106 attached to the Internet 102, but it is possible that the search engine could reside on the same computer 101 as the web browser. The search engine retrieves applicable information from one or more databases 104 connected to a database server computer 103 and returns a list of hyperlinks to the web browser. The database server computer 103 and its databases 104 are usually connected through a private LAN 107 to the search engine computer 106 to keep the databases themselves isolated from the Internet for security purposes. However, it is possible that the database server computer 103 and its databases 104 are connected to the Internet or more generalized Network. It is also possible that the databases 104 reside on or are directly connected to the search engine computer 106. When computer and Network bandwidth were limited, databases tended to be local to a computer or on a mainframe computer accessed through terminals. With the advent of fast processing and high Network throughput, databases tend to be distributed on a Network to allow for the greatest access and flexibility.

Figure 2:
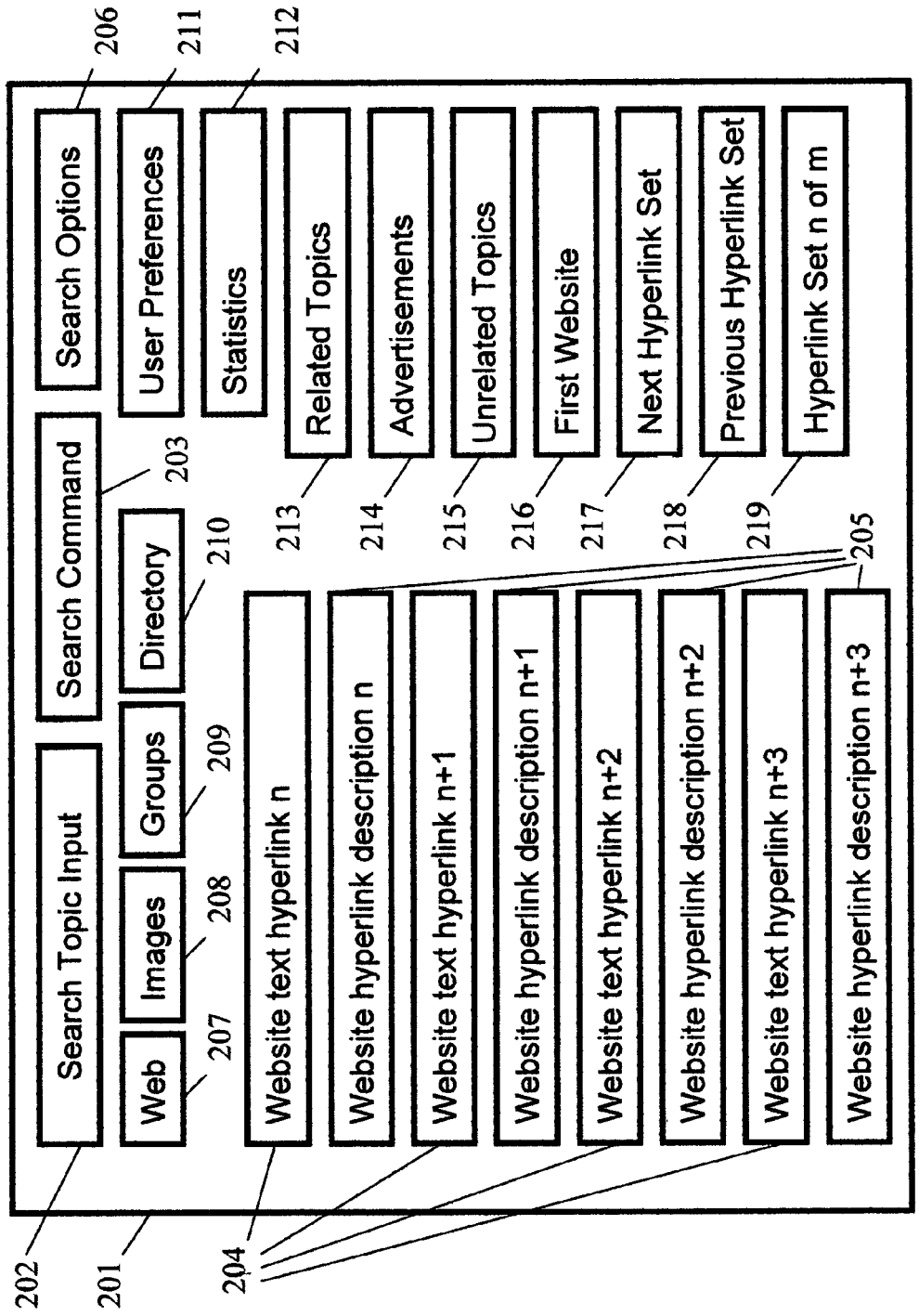
FIG. 2 shows a conventional search engine display in a web browser with command and control, a list of text hyperlinks returned from a search and optional value-add information.

FIG. 2 shows a typical prior art search engine display in a web browser 201 after executing a web search, which may contain any portion or combination of the following: an input box 202 for the user's search topic; commands 203 and 207 to execute a search on the web, search for images 208, search group listings 209, search directory listings 210, search and go directly 216 to the first website in the hyperlink list; hyperlinks to select the next hyperlink set 217, the previous hyperlink set 218, or a particular hyperlink set 219; hyperlink to advanced search options 206; hyperlink to user preferences 211; hyperlinks 213 to related topics; hyperlinks 215 to unrelated topics; hyperlinks 204 to webpages that the search engine has returned for a particular topic; a text description 205 for each hyperlink 204; statistics 212 for the results returned that may include the number of hyperlinks found for the associated search topic, the amount of time to execute the search, and which set of hyperlinks is currently displayed; and hyperlinks 214 to webpages related to advertisements. This conventional search paradigm returns lists of hyperlinks that are prioritized in relationship to the search topic. To view the actual webpage pointed to by the hyperlink, the hyperlink is selected and the web browser contacts the website that is managing the webpage and the web browser subsequently downloads the webpage to the web browser, if the webpage is available.

Figure 3:
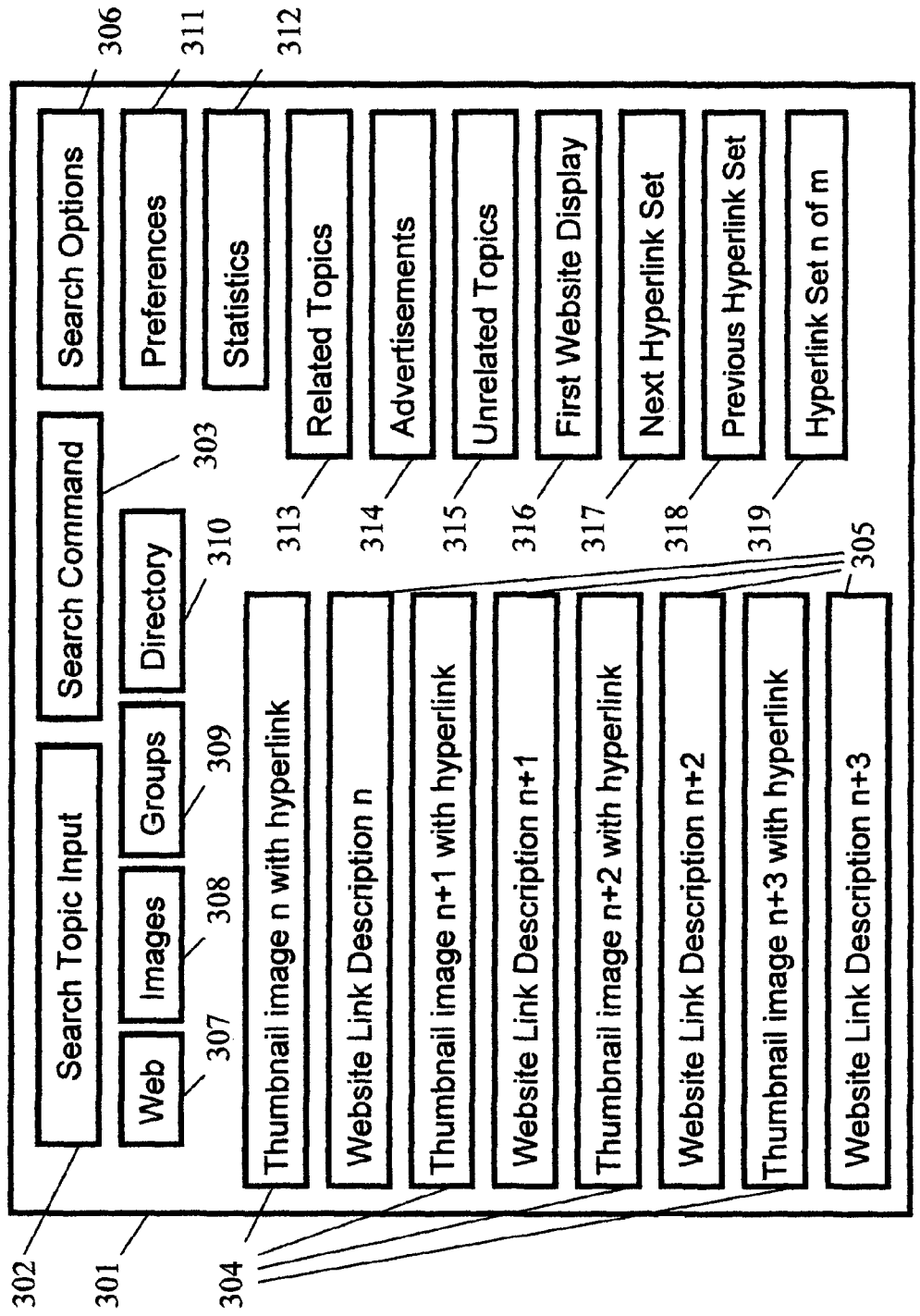
FIG. 3 shows a conventional search engine display in a web browser with command and control, a list of thumbnail images with hyperlinks returned from a search and optional value-add information.

FIG. 3 shows a typical prior art search engine display in a web browser 301 after executing a search for images, which may contain any portion or combination of the following: an input box 302 for the user's search topic; commands to execute a search 303, 307 on the web, search for images 308, search group listings 309, search directory listings 310, search and go 316 directly to the first website in the hyperlink list; hyperlinks to select the next hyperlink set 317, the previous hyperlink set 318, or a particular hyperlink set 319; hyperlink to advanced search options 306; hyperlink to user preferences 311; hyperlinks 313 to related topics; hyperlinks 315 to unrelated topics; thumbnail images 304 with hyperlinks to webpages that were returned by a search engine(s) for a particular topic; a text description 305 for each thumbnail image 304; statistics 312 for the results returned that may include the number of hyperlinks found for the associated search topic, the amount of time to execute the search, and which hyperlink set is currently displayed; and hyperlinks 314 to webpages related to advertisements. This conventional search paradigm returns lists of thumbnail images that are images that can themselves be selected, such as by clicking the image with a computer Mouse, to act as hyperlinks. These thumbnail image hyperlinks are prioritized in relationship to the search topic. To view the actual webpage pointed to by the thumbnail image hyperlink, the thumbnail image hyperlink is selected and the web browser contacts the website that is managing the webpage and the web browser subsequently downloads the webpage to the web browser, if the webpage is available.

Figure 4:
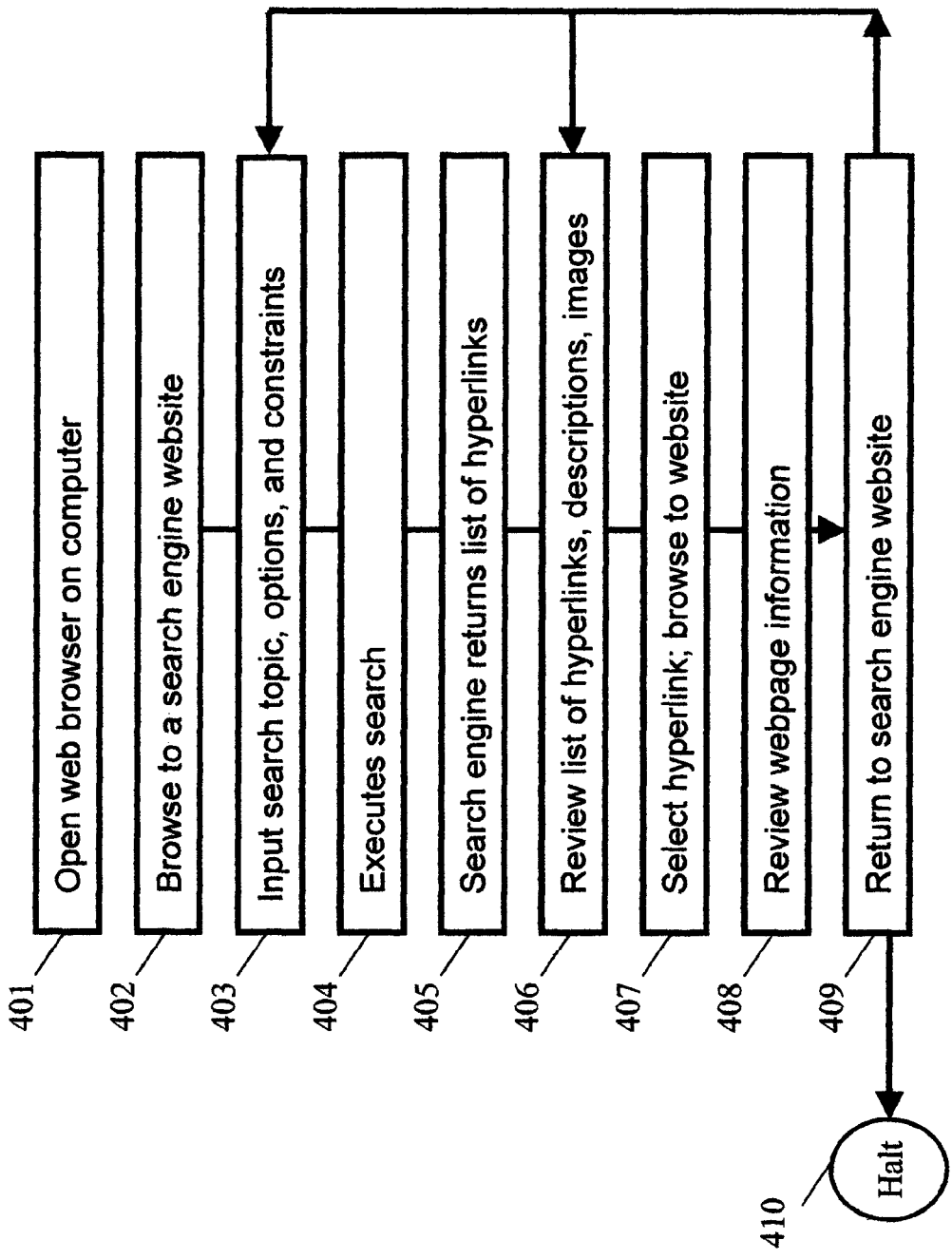
FIG. 4 shows a flowchart of a conventional information acquisition and review cycle for a search performed with a web browser and search engine.

FIG. 4 shows a flow chart for a possible sequence of events for a conventional information search utilizing a web browser on a computer and a search engine in a Networked environment. A web browser is opened 401 on a computer and the user browses 402 to a search engine website and inputs 403 the search topic and any options or constraints into the search engine webpage and executes 404 the search. The search engine returns 405 a limited list of hyperlinks, usually on the order of 10-20 hyperlinks. The user may review 406 the hyperlinks, descriptions, and any accompanying thumbnail images, then select 407 a desired hyperlink. The web browser downloads the webpage associated with the hyperlink, if the webpage is available. The user reviews 408 the webpage information and may (i) return 409 to the search engine webpage to continue to review the list of hyperlinks 406 and select 407 another hyperlink from the hyperlink list to browse to another webpage; or (ii) return 409 to the search engine webpage and input 403 a new search topic and any options or constraints into the search engine webpage and execute 404 a new search.

This ping-pong process between the search engine website and the websites associated with the hyperlinks returned from the search engine is continued until the user has found the sought after information or halts the search 410.

Figure 5:
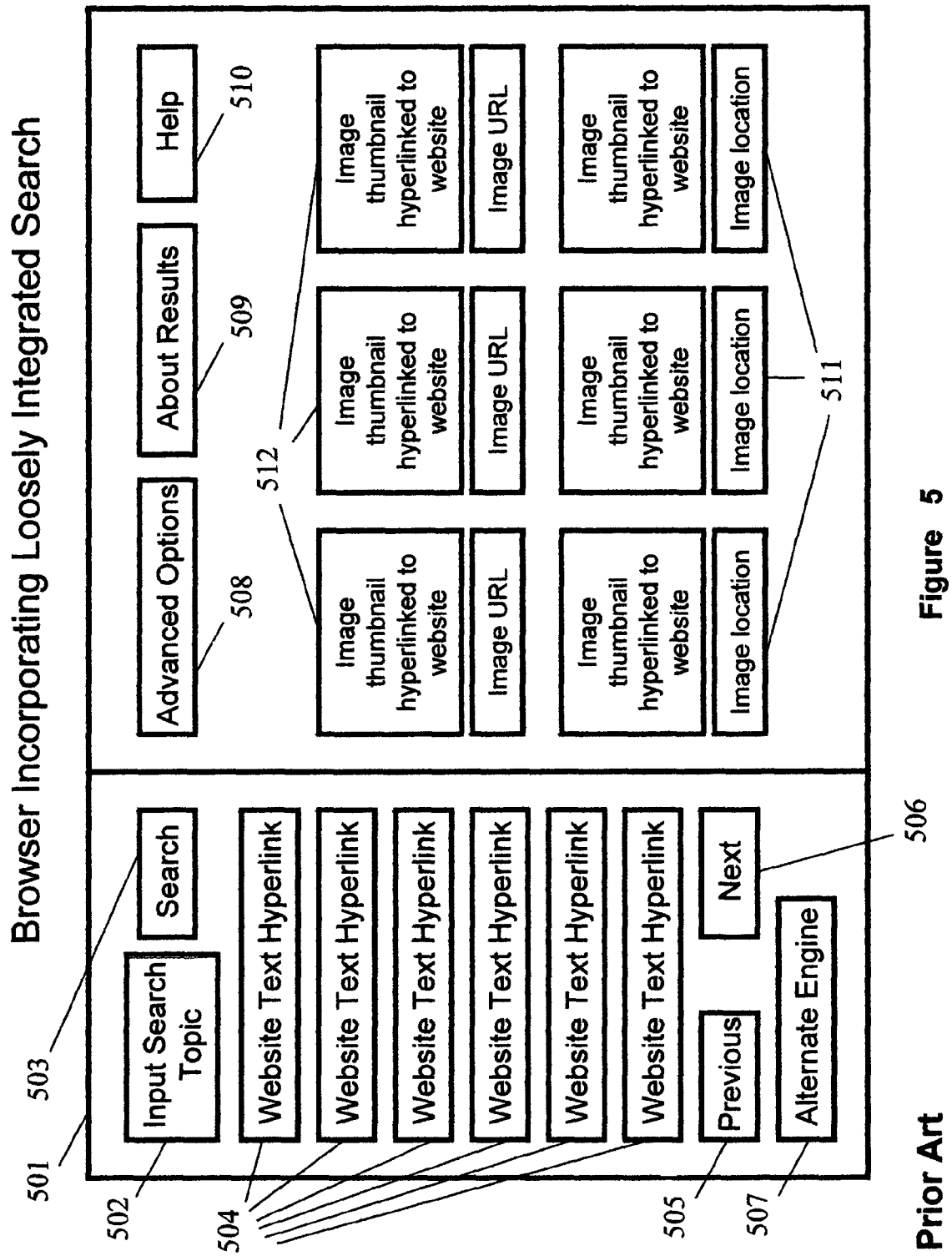
FIG. 5 shows a conventional web browser incorporating a loosely integrated search function with command and control, a list of text hyperlinks, a list of images with hyperlinks returned from a search, and optional value-add information.

FIG. 5 shows a prior art web browser display 501 incorporating a loosely integrated search capability, after a search has been executed. The web browser display may contain any portion or combination of the following: an input box 502 for the user's search topic; command 503 to execute a search; hyperlinks to select the next hyperlink set 506 or the previous hyperlink set 505; hyperlink to advanced search options 508; hyperlink to information regarding the results 509 of the search; hyperlink to help 510; hyperlinks 504 to webpages that the search engine has returned for a particular topic; and a selection box 507 to select an alternate search engine. The user isn't required to browse to the search engine website to input criteria, execute a search, or review the resultant hyperlinks. The list of hyperlinks returned by the search engine, such as Internet Explorer, is capable of displaying both a text hyperlink list 504 in one panel of the web browser and thumbnail images 512 with hyperlinks and image locations 511 in a second panel. Selecting a text 504 hyperlink or a thumbnail image 512 representing a hyperlink, instructs the web browser to open the webpage associated with the hyperlink, if the webpage is available. The second panel is then replaced with such webpage. The text hyperlink list 504 remains in the left panel.

Figure 6:
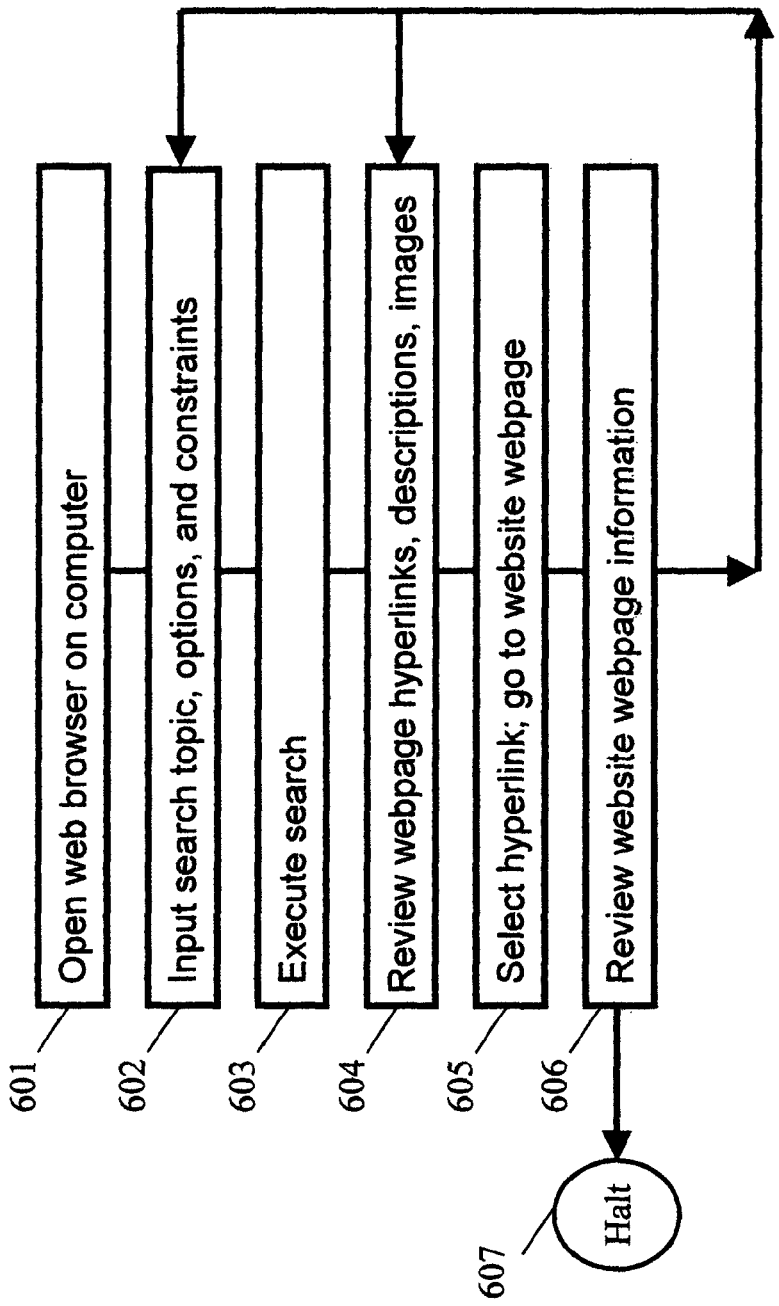
FIG. 6 shows a flowchart of a conventional information acquisition and review cycle for a search performed with a web browser incorporating a loosely integrated search function.

FIG. 6 shows a flow chart for a possible sequence of events for a conventional information search utilizing a web browser incorporating a loosely integrated search capability on a computer in a Networked environment. Specifically, a web browser is opened 601 on a computer and the user inputs 602 the search topic and any options or constraints and execute 603 a search. The search engine returns a limited list of hyperlinks to the web browser, usually on the order of 10-20 hyperlinks. The user reviews 604 the hyperlinks, descriptions, and any accompanying thumbnail images and selects 605 a desired hyperlink. The web browser opens the webpage associated with the hyperlink, if the webpage is available. The user reviews 606 the information on the webpage and may (i) continue to review 604 the list of hyperlinks and select 605 another hyperlink from the hyperlink list to open another webpage; or (ii) input 602 a new search topic and any options or constraints into the web browser and execute 603 a new search; or (iii) terminate 607 the search.

Figure 7:
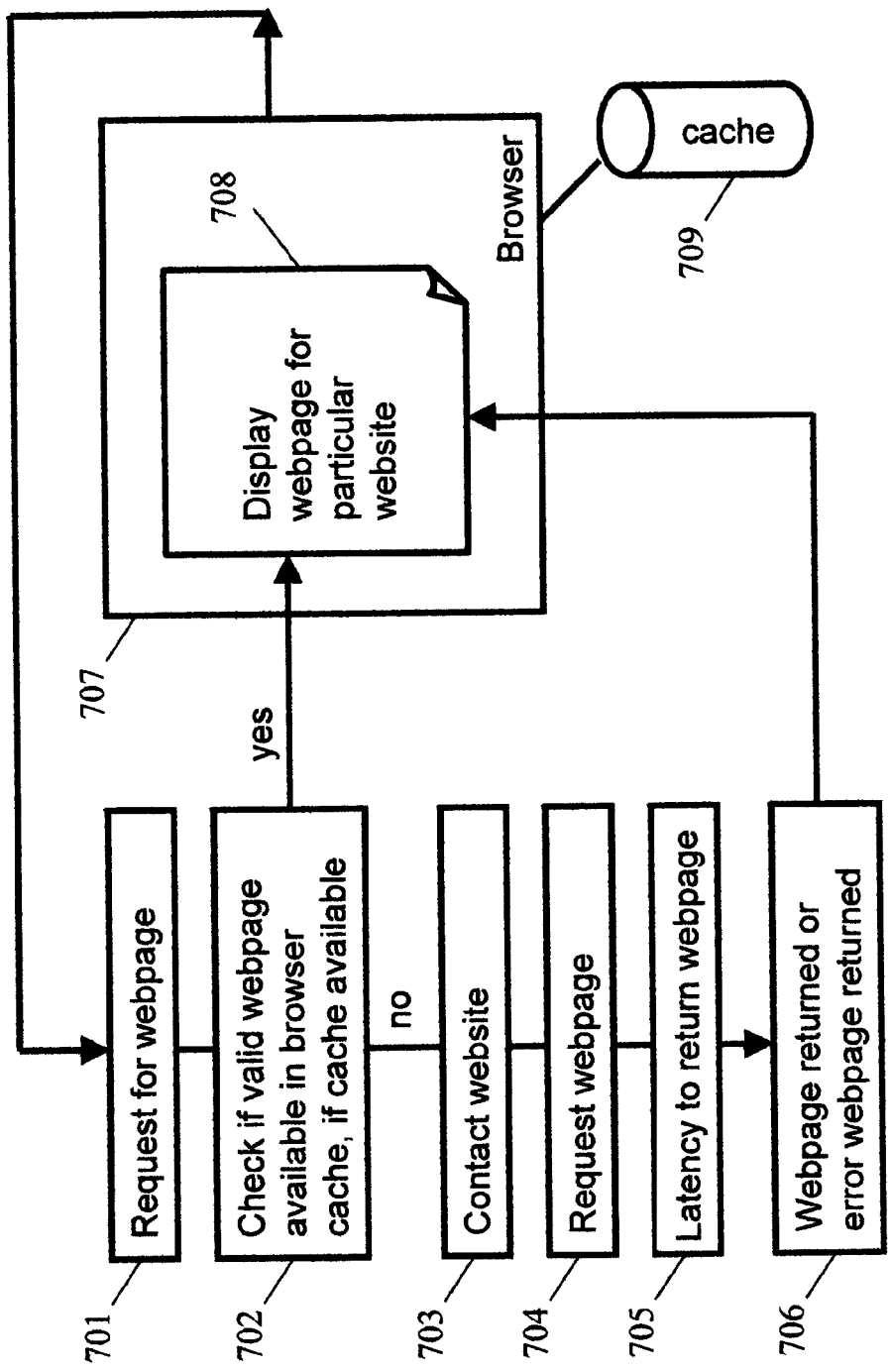
FIG. 7 shows a flowchart of a conventional web browser serial webpage loading cycle, after a web browser has requested a new webpage from a website or other Network resource.

FIG. 7 shows a flowchart for a possible sequence of events for loading a webpage into a conventional web browser 707. Specifically, the web browser requests 701 a webpage. If the web browser has an active cache 709 memory, the cache 709 is checked 702 by the web browser for a valid webpage. If the webpage is valid, the web browser displays 708 the webpage. If the web browser's 707 cache 709 isn't active or a valid webpage isn't available in cache 709 memory, the web browser contacts 703 the website associated with the webpage and requests 704 the webpage. After a period of time 705, which includes the website and Network latency, the webpage if available, is returned 706 to the web browser 707 for display 708. Even though a web browser may have multiple concurrent connections to a particular webpage to load elements from such webpage, this aforementioned serial cycle is inherent for loading each successive webpage. Therefore, the latency 705 or wasted time is additive for each webpage loaded by the conventional web browser 707.

Figure 8:
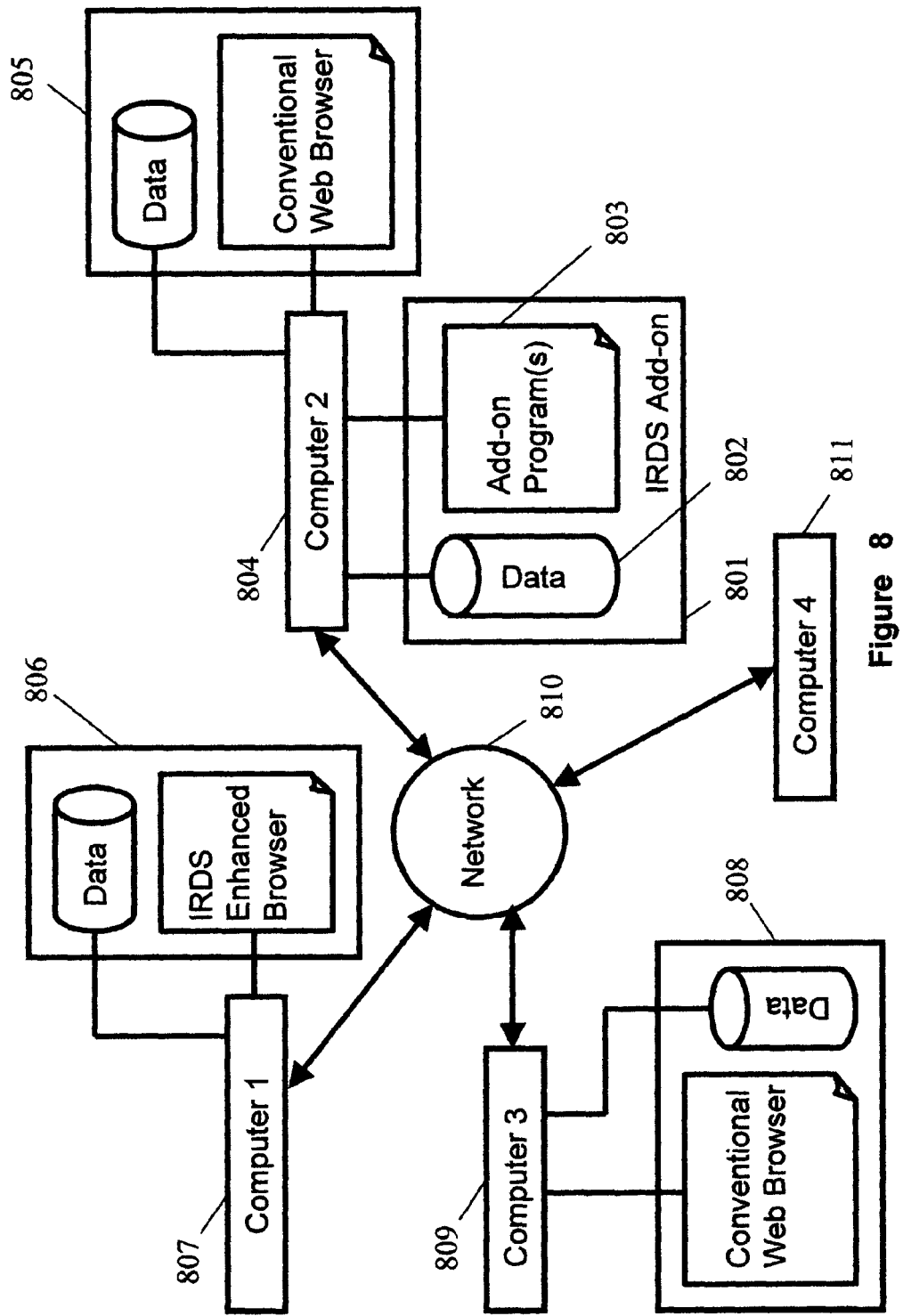
FIG. 8 shows possible levels of IRDS integration with a conventional web browser in a Networked environment.

FIG. 8 shows possible levels of IRDS integration, according to the present invention, with a conventional web browser including (i) a fully integrated IRDS and web browser 806 that can be executed and displayed on a computer 807;

(ii) an IRDS add-on 801 to a web browser 805, where the IRDS program(s) 803 and any data 802 required, are separate from the web browser 805 and its data store. The IRDS add-on 801 communicates with the web browser 805 and any output is displayed on the local computer 804. Both the IRDS add-on 801 and web browser 805 are executed on the local computer 804; or (iii) an IRDS add-on 801, distributed on a Network 810 and residing on a different computer 804 than the web browser. The IRDS add-on 801 communicates with the web browser 808 residing on computer 809. Any output is displayed on the web browser computer 809.

A client-server relationship is also possible, where a computer terminal 811 does not execute any programs, but displays and controls the execution of
 (i) a web browser 805 or a web browser 808 working in conjunction with an IRDS add-on 801; or
 (ii) a fully integrated IRDS enhanced web browser 806.

Figure 9:
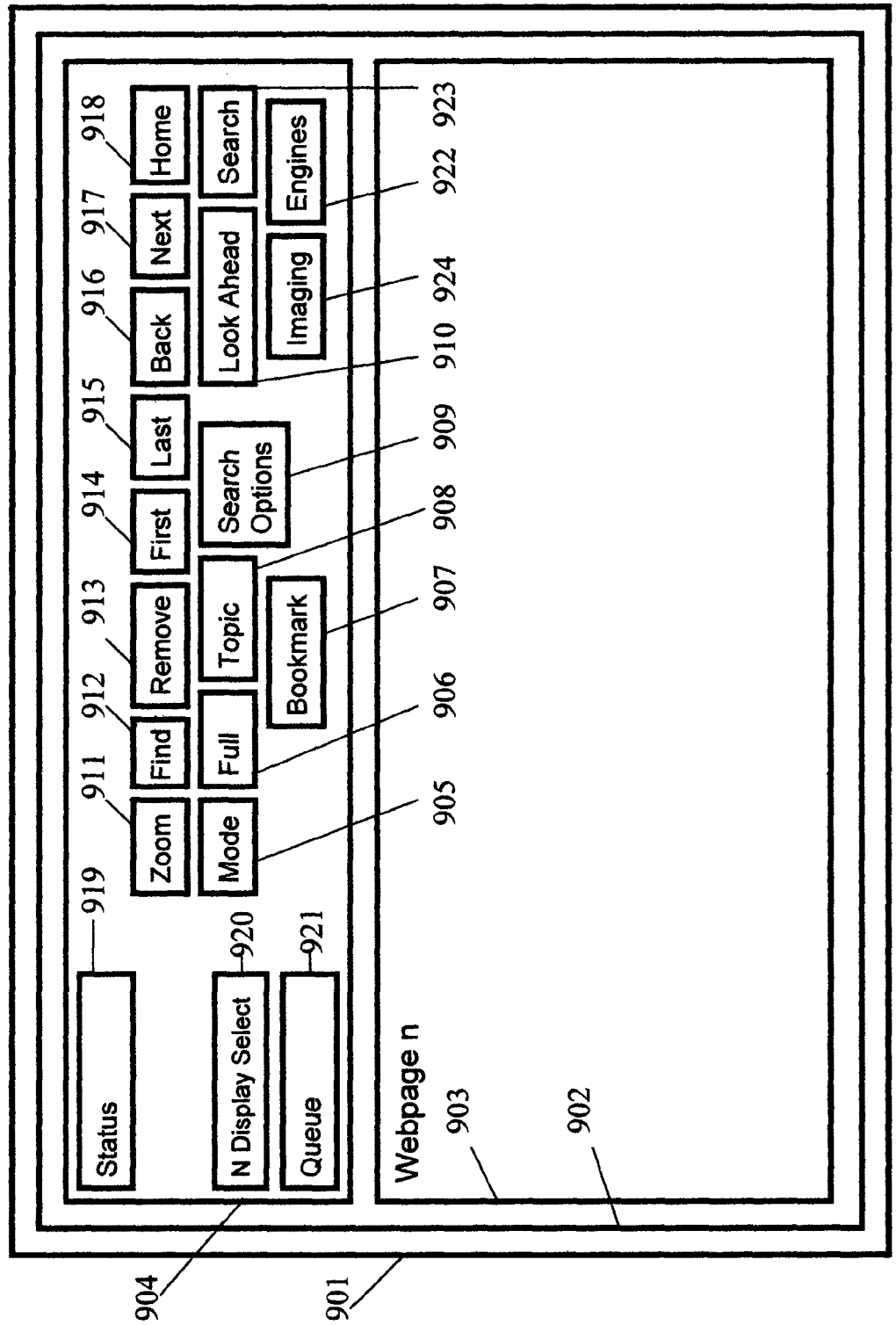
FIG. 9 shows an IRDS command, control, status panel and a single (1) fully active webpage displayed.

FIG. 9 shows an IRDS enhanced web browser 901 display 902 that contains function grouping 904 that includes command, control, and status. Features to be described enable search, display, and review of Network based information in a fast efficient manner. Inputs may be entered in the web browser display 902, a web browser generated window, and/or a webpage loaded into the web browser. Inputs may include: a search topic 908; search options or constraints 909; search engine selection 922; concurrent webpage loading (concurrent means performing multiple actions at nearly the same time without waiting for a prior action to complete) and look-ahead webpage preloading control 910; initiate search execution 923; select number of webpages to be display simultaneously 920; change the multiple webpage display to the one webpage currently selected 906; group bookmark options 907 for any portion of a hyperlink queue; setting the users homepage 918 to a selected webpage; removing 913 a webpage or multiple webpages from the web browser display and/or the webpage queue and/or the associated hyperlinks from the hyperlink queue; displaying the next set 917 of webpages; displaying the previous set 916 of webpages; displaying the first set 914 of webpages; displaying the last set 915 of webpages; zooming 911 in or out on a selected webpage(s) or any portion thereof; finding and highlighting 912 the search topic on the webpages currently displayed; creating an image 924 of a selected portion of a web browser display; switching 905 from IRDS enhanced mode to conventional web browser mode and browse to the selected webpage; and list 921 the current hyperlink queue and upon selection of one or more hyperlinks then display the associated webpages. Outputs may include the fully active webpage display 903 and status information 919 including but not limited to: number of webpages preloaded, total number of webpages that match the search topic criteria, processor utilization, network utilization, memory utilization, and current set of webpages displayed.

Figure 10:
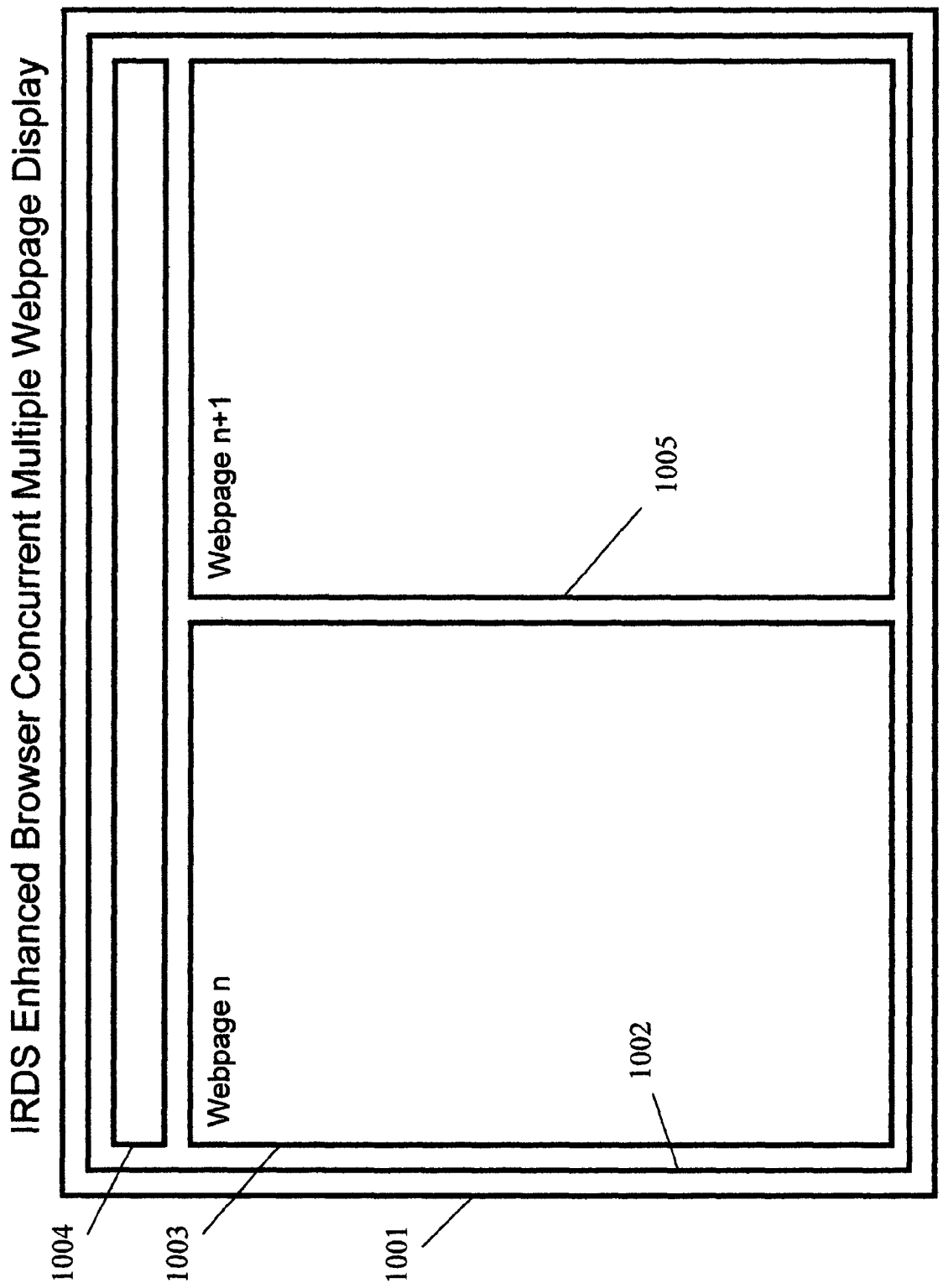
FIG. 10 shows an IRDS command, control, status panel, and two (2) fully active webpages displayed.

FIG. 10 shows an IRDS enhanced web browser 1001 including display 1002 containing function grouping 1004 that further includes command, control, and status for a web browser and features as enumerated in FIG. 9. Also included are two (2) fully active webpages 1003 and 1005 that are displayed concurrently. No conventional web browser displays multiple webpages simultaneously from a list of hyperlinks returned by a search engine.

Figure 11:
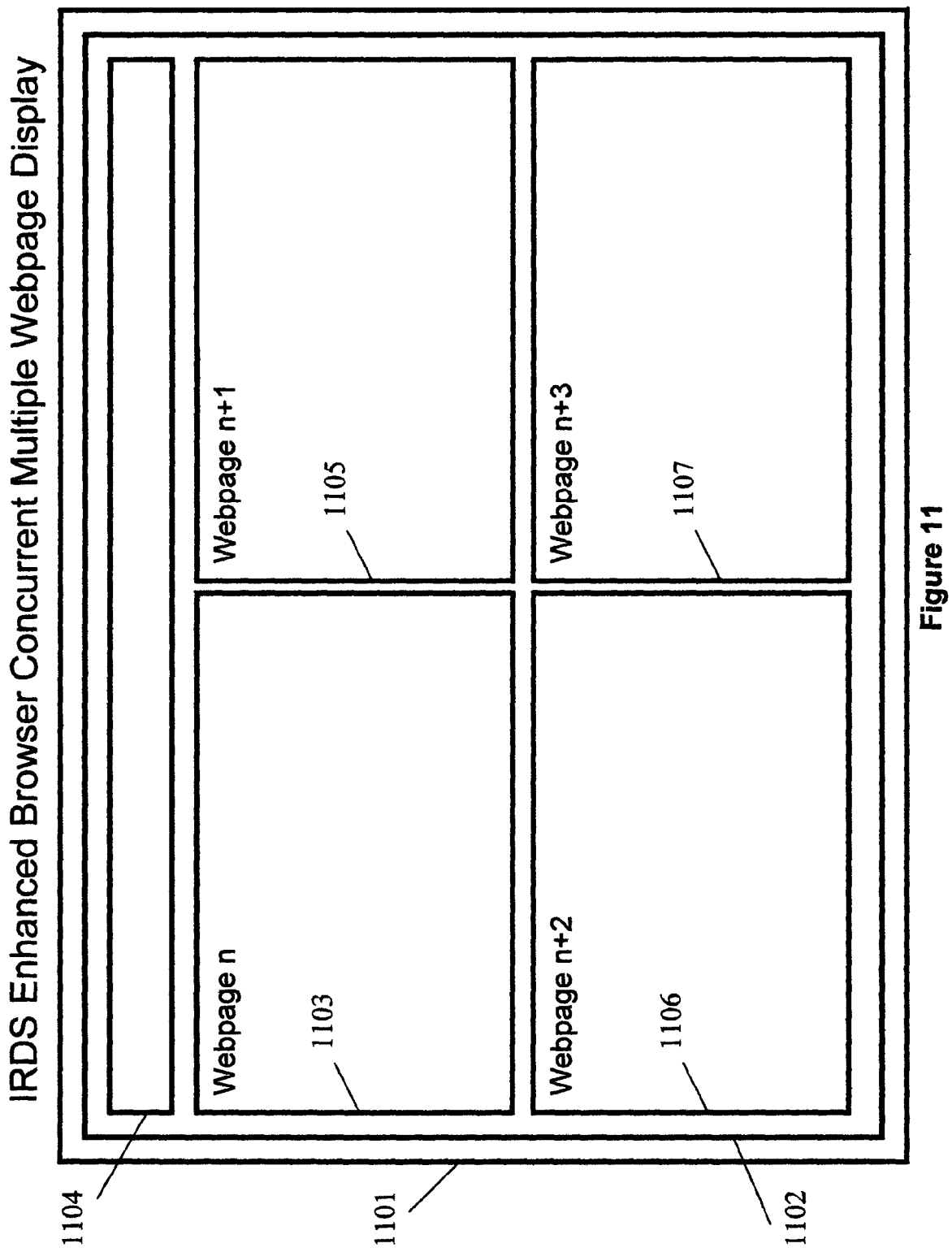
FIG. 11 shows an IRDS command, control, status panel, and four (4) fully active webpages displayed.

FIG. 11 shows an IRDS enhanced web browser 1101 including display 1102 containing function grouping 1104 that further includes command, control, and status for a web browser and features as enumerated in FIG. 9. Also included are four (4) fully active webpages 1103, 1105, 1106, and 1107 that are displayed concurrently. Again, no conventional web browser displays multiple webpages simultaneously from a list of hyperlinks returned by a search engine.

Figure 12:
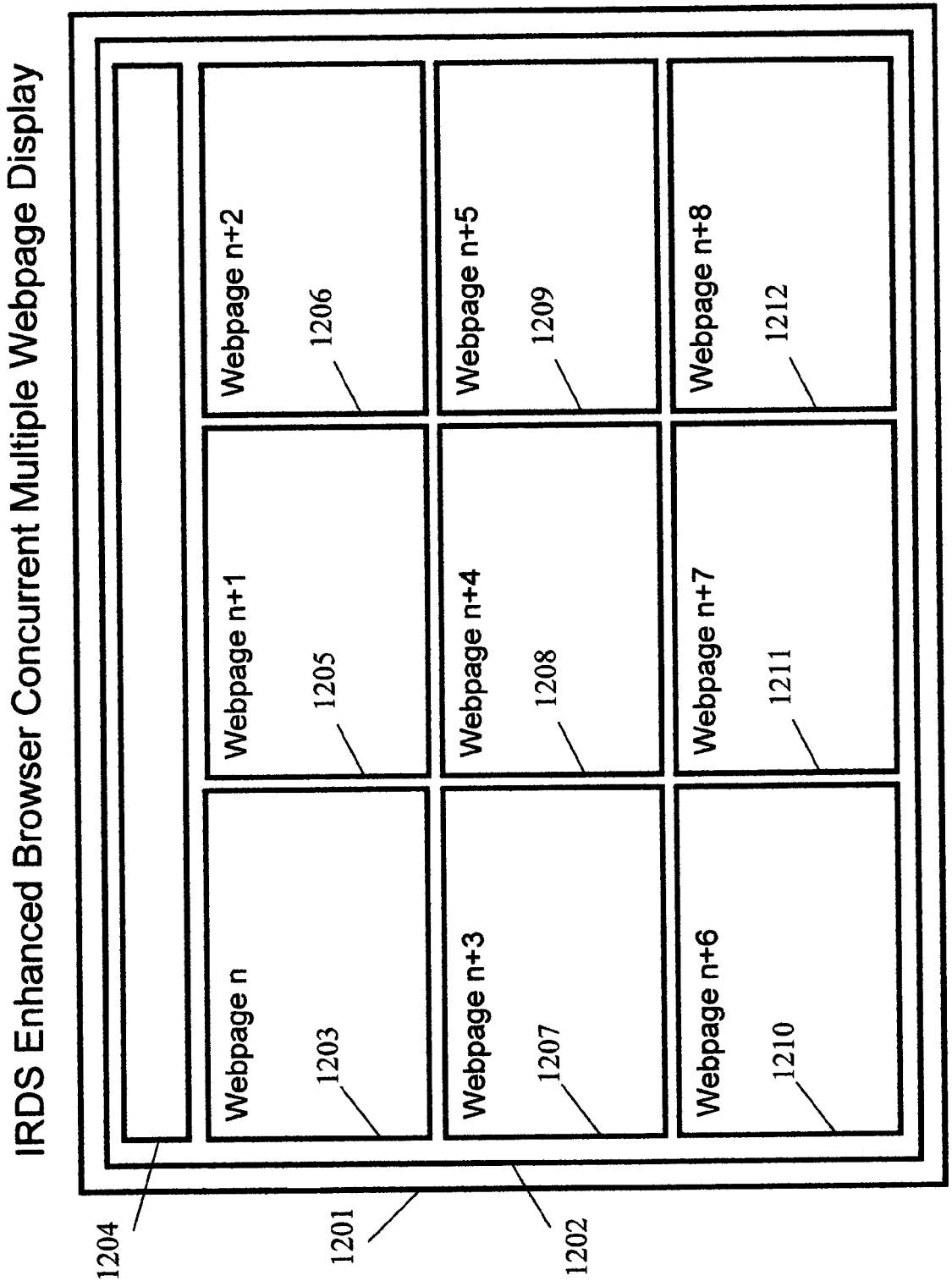
FIG. 12 shows the IRDS command, control, status panel and nine (9) fully active webpages displayed.

FIG. 12 shows an IRDS enhanced web browser 1201 including display 1202 containing function grouping 1204 that further includes command, control, and status for a web browser and features as enumerated in FIG. 9. Also included are nine (9) fully active webpages 1203, 1205, 1206, 1207, 1208, 1209, 1210, 1211, and 1212 that are displayed concurrently. Depending on the display monitor screen size and resolution, various numbers and configurations of simultaneous webpage displays can be implemented with the IRDS paradigm described herein.

Figure 13:
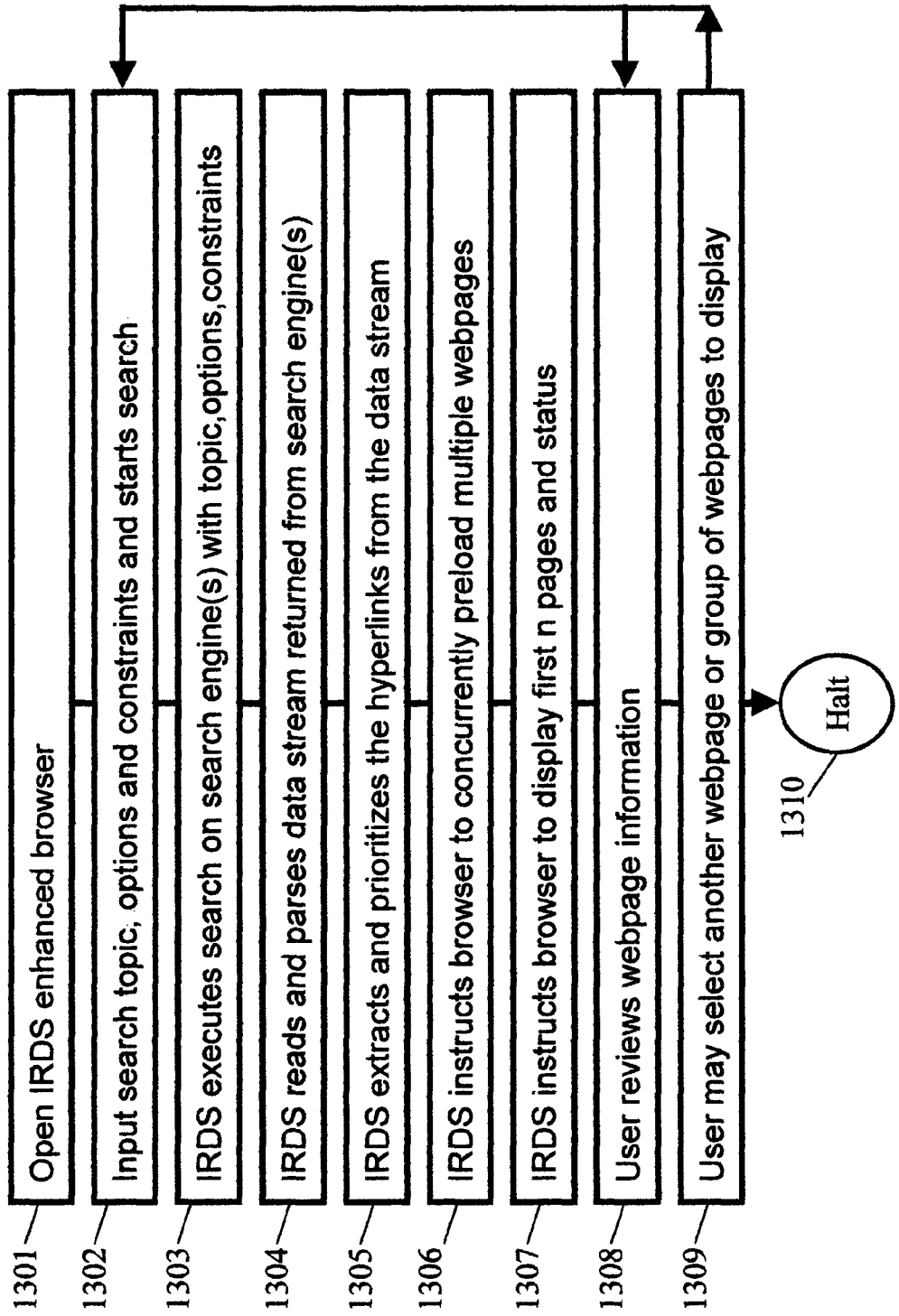
FIG. 13 shows a flowchart of an IRDS based information acquisition and review cycle.

FIG. 13 shows a flowchart for a possible sequence of events for an information search in a Networked environment utilizing an IRDS enhanced web browser. Specifically, the IRDS enhanced web browser is opened 1301 on a computer and the user inputs 1302 the search topic and any options or constraints into the IRDS command and control center and starts a search. The IRDS contacts one or more selected search engines and executes 1303 searches on each search engine with the appropriate grammar for each search engine. The IRDS reads and parses 1304 each data stream returned from each search engine and extracts 1305 the lists of hyperlinks from the data streams and prioritizes the hyperlinks, and instructs the web browser to concurrently preload 1306 a number of the webpages pointed to by such hyperlinks. One or more webpages, depending on the display control, and status are displayed 1307 in the web browser simultaneously. The user may review 1308 any displayed webpage or select 1309 another webpage or group of webpages to display. After completing such review, the user can halt the search process 1310, start a new search 1302, or select other webpages 1309 to review.

Figure 14:
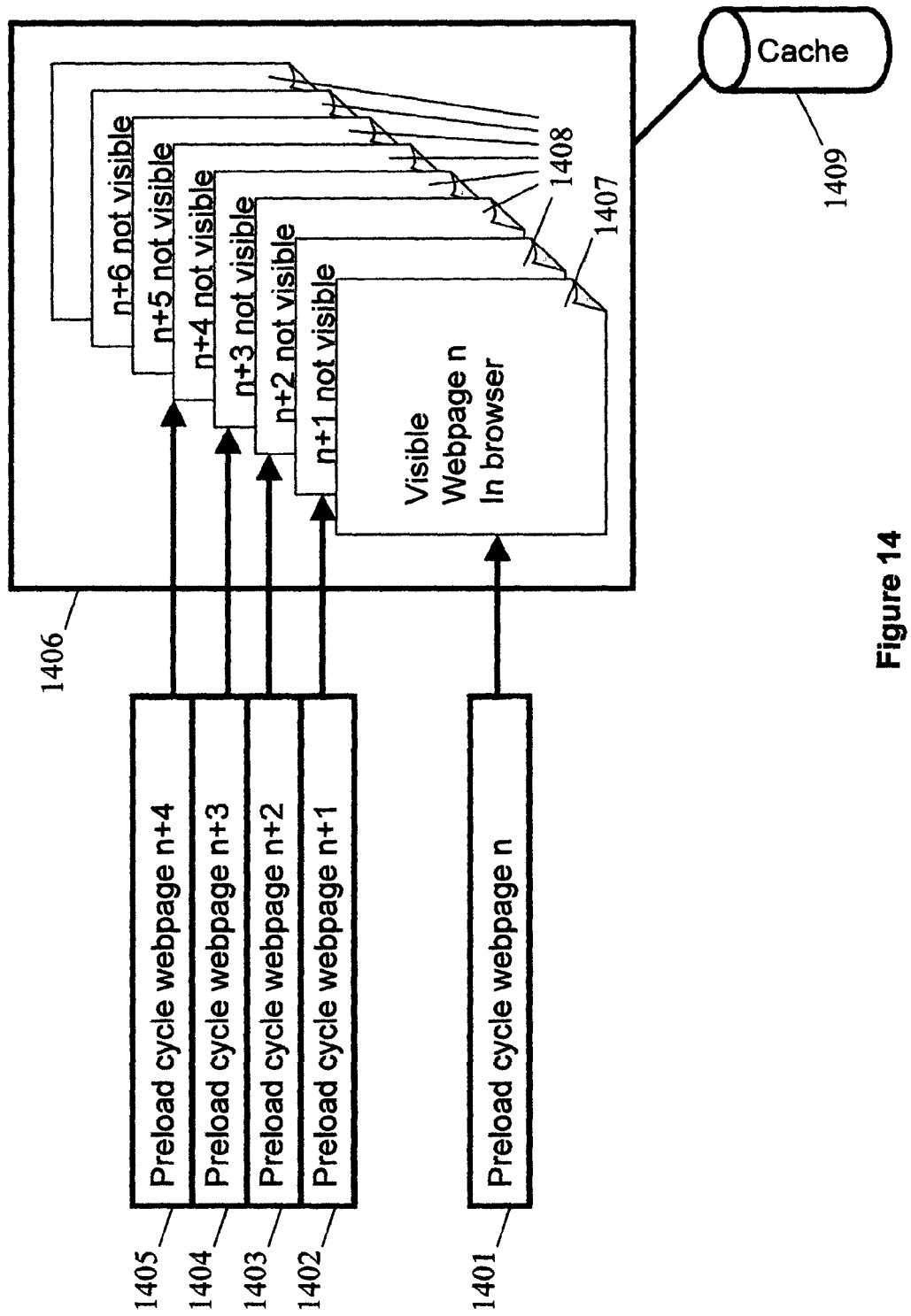
FIG. 14 shows an IRDS directed, web browser concurrent multiple webpage preloading from one or more websites, after a search has been initiated.

FIG. 14 shows the IRDS directing a web browser 1406 to concurrently preload multiple webpages 1401, 1402, 1403, 1404, and 1405 into the web browser 1406. If a valid webpage already exists in the web browser cache 1409—if the cache is available—then the web browser loads the webpage from the cache; otherwise the web browser starts a preload cycle from the Network for each webpage. By concurrently preloading the webpages into the web browser, the Latency to preload multiple webpages is not additive, as in the conventional web browser serial loading case of FIG. 7. Each preload cycle in FIG. 14 has its own independent thread and will not hold-up other threads while it completes. As many webpages can be preloaded at the same time and only a few are displayed 1407 simultaneously, most of the webpages 1408 are held in a webpage queue, waiting to be displayed. When the user selects another webpage that has been preloaded, it is immediately available for display in the web browser.

Figure 15:
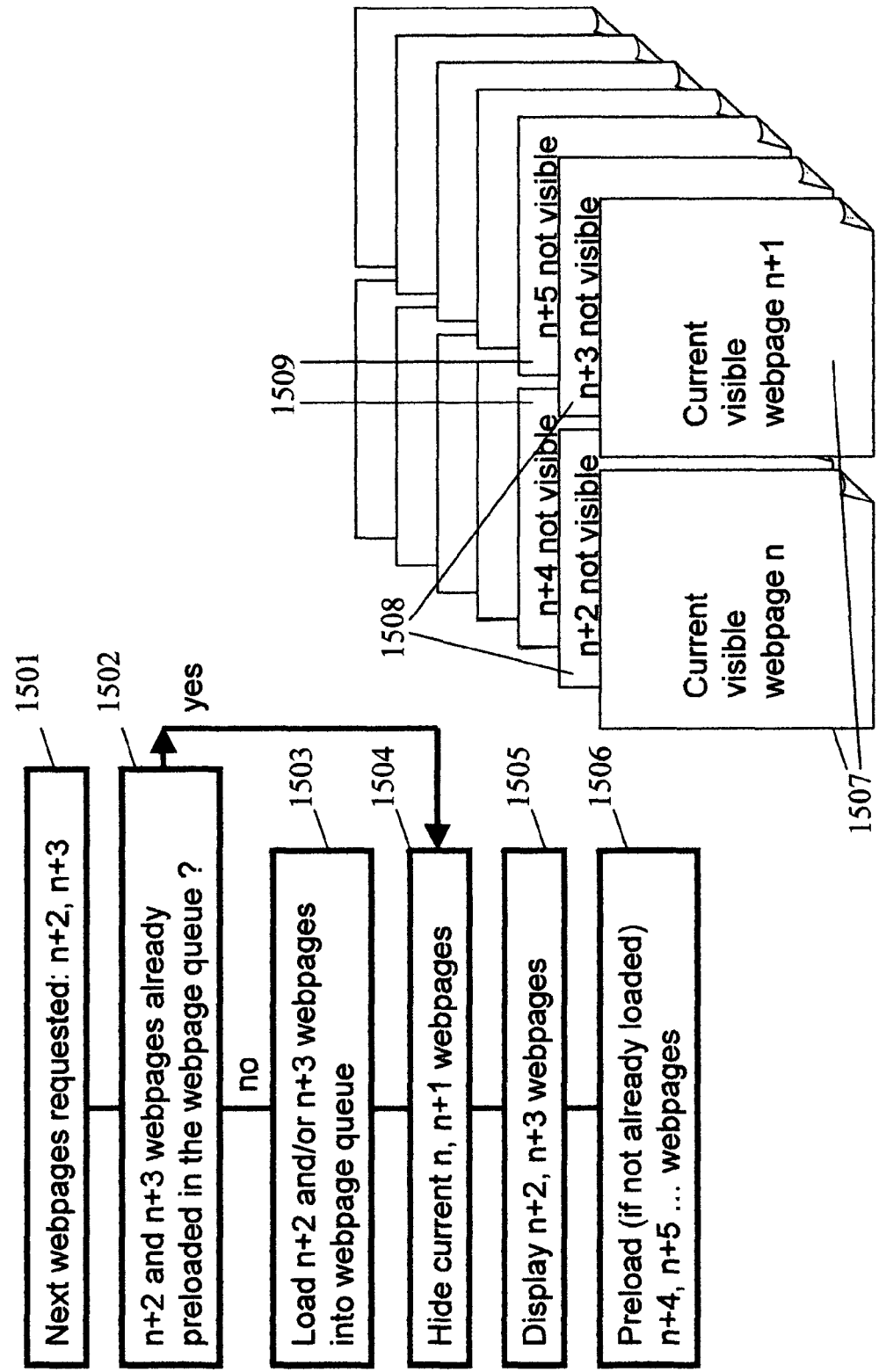
FIG. 15 shows a flowchart that describes an IRDS directed, web browser look-ahead Next-In-Queue Webpage Preloading function, where when a request is made to view the next group of webpages, the group of webpages immediately following this next group of webpages pointed to by the associated hyperlinks in the hyperlink queue are preloaded into a webpage queue. These webpages are not visible, but are immediately available to become visible and viewed upon demand.

FIG. 15 shows a flowchart for a possible sequence of events for Next-In-Queue Webpage Preloading and a diagram depicting an IRDS enhanced web browser display of two (2) fully active and simultaneously displayed webpages 1507 and a webpage queue. Next-In-Queue Webpage Preloading refers to a method where IRDS directs a web browser to preload the next webpage or webpages into a webpage queue. The web browser loads such webpages from hyperlinks that point to these webpages. These hyperlinks are in their own queue. Specifically, an IRDS enhanced web browser requests 1501 the next webpages in the webpage queue for display. The number of webpages requested from the webpage queue depends on and is the same as the number of webpages currently displayed. In this example, two (2) webpages 1507 are currently displayed and the next two (2) webpages 1508 in the webpage queue are requested 1501. If the webpages are not preloaded 1502 in the webpage queue, then the hyperlinks pointing to these webpages are utilized to load 1503 such webpages into the webpage queue. After the webpages are loaded 1503 into the webpage queue or if the webpages are already preloaded 1502 in the webpage queue, then the currently displayed webpages 1507 are made not visible 1504 and the next two (2) webpages 1508 in the webpage queue are made visible 1505. The following two (2) webpages 1509 thereafter are then preloaded 1506 and not visible. The number of webpages 1509 to preload 1506 is governed by the number of webpages to display on the lower bound, such that immediate display of such webpages by the web browser is possible upon demand, and available Network and processor bandwidth on the upper bound. Loaded and preloaded in the foregoing context can mean that the webpage and its constituent parts (i) have been fully downloaded from a Network, computer storage or memory;
(ii) have been partially downloaded from a Network, computer storage or memory;
(iii) are in the process of being downloaded from a Network, computer storage or memory; and
(iv) any combination of (ii) and (iii).

Figure 16:
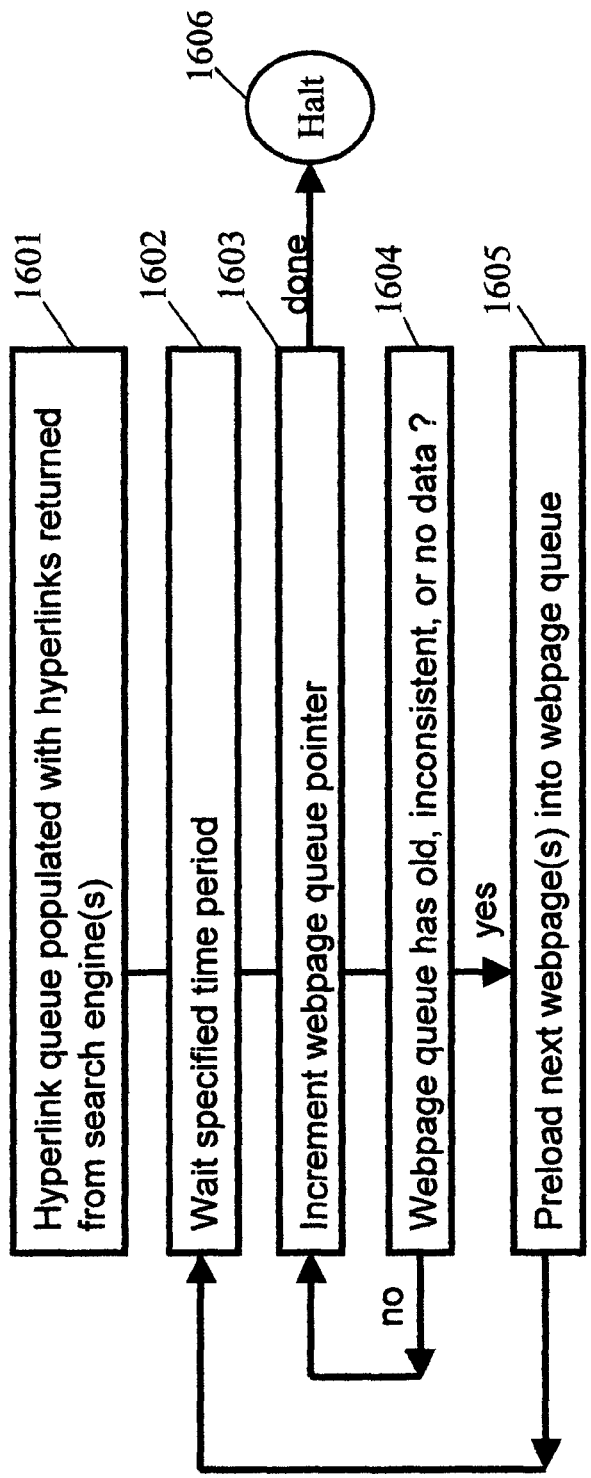
FIG. 16 shows a flowchart that describes an IRDS directed, web browser look-ahead Periodic Webpage Preloading function. After a webpage is loaded into the web browser display, the associated hyperlink in the hyperlink queue is marked as loaded. The Periodic Webpage Preloading function scans the hyperlink queue for hyperlinks not marked as loaded and directs the web browser to preload one or more webpages into a webpage queue pointed to by such unmarked hyperlinks. These webpages are not visible, but are immediately available to become visible and viewed upon demand. After directing the web browser to preload such webpages, the unmarked hyperlinks are marked as loaded and the function waits a specified period of time before rescanning the hyperlink queue and repeating the process.

FIG. 16 shows a flowchart for a possible sequence of events for Periodic Webpage Preloading. After a search on a Network has been initiated through an IRDS enhanced web browser, a list of hyperlinks to webpages may be returned from each search engine utilized and put into a hyperlink queue 1601. These hyperlinks point to webpages that may be distributed on a Network and may be on multiple websites. Periodic Webpage Preloading refers to a method where IRDS periodically searches the webpage queue for locations that have old, inconsistent, or no data 1604. Upon finding an unloaded position 1604 in the webpage queue, the web browser is directed to preload 1605 one or more webpages to take advantage of this available memory. Such webpages are not visible, until the web browser needs to display the webpages. Specifically, after the hyperlink queue has been populated 1601 with the hyperlinks returned from the search engine(s), a set period of time is waited 1602 and then a position pointer in the webpage queue is incremented 1603. The new position 1604 in the webpage queue is checked for old webpage data, inconsistent webpage data, or no webpage data. If the webpage in the webpage queue has been preloaded and is the correct webpage pointed to by the associated hyperlink in the hyperlink queue, then the position pointer 1603 is incremented and the next position 1604 checked. If the webpage 1604 in the webpage queue hasn't been loaded or isn't the correct webpage pointed to by the associated hyperlink in the hyperlink queue, the web browser utilizes the hyperlink in the hyperlink queue to preload the webpage 1605 into the webpage queue. This process goes to sleep for a set period of time 1602 and then repeats. If at any time, the end of the webpage queue is reached, the process is temporarily halted 1606. The waiting period and the number of webpages preloaded on each repetition can be adjusted according to available Network and processor bandwidth. The preloading process should not be detrimental to the user interacting with the currently displayed webpages.

Figure 17:
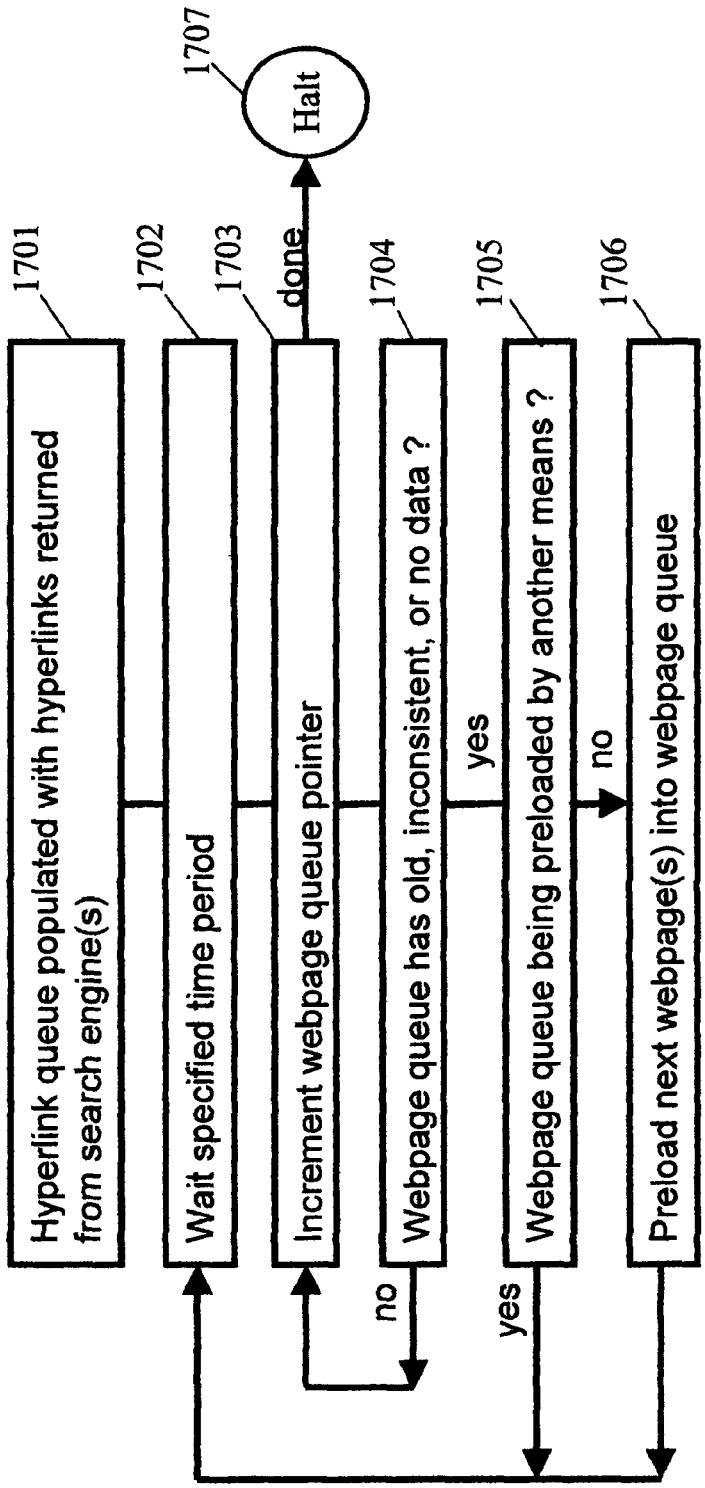
FIG. 17 shows a flowchart that describes an IRDS directed, web browser look-ahead Periodic Webpage Preloading function with webpage loading collision avoidance. After a webpage is loaded into the web browser display, the associated hyperlink in the hyperlink queue is marked as loaded. The Periodic Webpage Preloading function scans the hyperlink queue for hyperlinks not marked as loaded and directs the web browser to preload one or more webpages into a webpage queue pointed to by such unmarked hyperlinks, if such webpages are not already in the process of being loaded by a different type of look-ahead function, such as described in FIG. 15 and FIG. 19. These webpages are not visible, but are immediately available to become visible and viewed upon demand. After directing the web browser to preload such webpages, the unmarked hyperlinks are marked as loaded and the function waits a specified period of time before rescanning the hyperlink queue and repeating the process.

FIG. 17 shows a flowchart for a possible sequence of events for Periodic Webpage Preloading with loading collision avoidance. After a search on a Network has been initiated through an IRDS enhanced web browser, a list of hyperlinks to webpages may be returned from each search engine utilized and put into a hyperlink queue 1701. These hyperlinks point to webpages that may be distributed on a Network and may be on multiple websites. Periodic Webpage Preloading with loading collision avoidance refers to a method where IRDS periodically searches the webpage queue for locations that (i) have old, inconsistent, or no data 1704; and
(ii) are not being preloaded 1705 by another method.

Upon finding such an unloaded position in the webpage queue, the web browser is directed to preload 1706 one or more webpages. Such webpages are not visible, until the web browser needs to display the webpages. Specifically, after the hyperlink queue 1701 has been populated with the hyperlinks returned from the search engine(s), a set period of time is waited 1702 and then a position pointer in the webpage queue is incremented 1703. The new position 1704 in the webpage queue is checked for old webpage data, inconsistent webpage data, or no webpage data. If the webpage in the webpage queue has been preloaded and is the correct webpage pointed to by the associated hyperlink in the hyperlink queue, then the position pointer 1703 is incremented and the next position 1704 checked. If the webpage 1704 in the webpage queue hasn't been loaded or isn't the correct webpage pointed to by the associated hyperlink in the hyperlink queue and isn't in the process of being preloaded 1705 by another method, the web browser utilizes the hyperlink in the hyperlink queue to preload 1706 the webpage into the webpage queue. The process then goes to sleep for a set period of time 1702 and then repeats. If there is a preloading 1705 conflict, the process goes to sleep for a set period of time 1702 and then repeats. If at any time, the end of the webpage queue is reached, the process is temporarily halted 1707. The waiting period and the number of webpages preloaded on each repetition can be adjusted according to available Network and processor bandwidth. The preloading process should not be detrimental to the user interacting with the currently displayed webpages.

Figure 18:
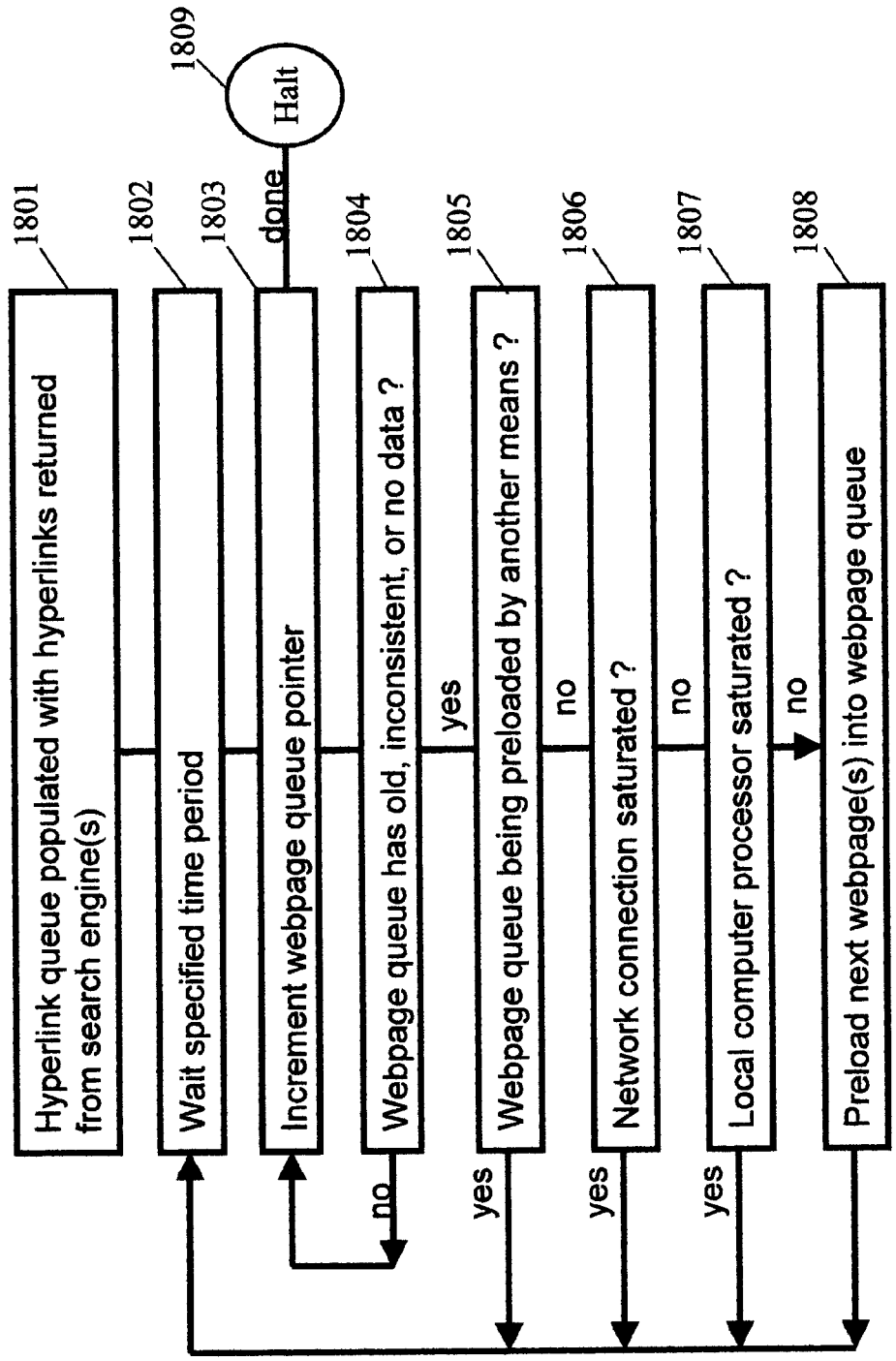
FIG. 18 shows a flowchart that describes an IRDS directed, web browser look-ahead Periodic Webpage Preloading function with webpage loading collision avoidance and Network and processor saturation avoidance. After a webpage is loaded into the web browser display, the associated hyperlink in the hyperlink queue is marked as loaded. The Periodic Webpage Preloading function scans the hyperlink queue for hyperlinks not marked as loaded and directs the web browser to preload one or more webpages into a webpage queue pointed to by such unmarked hyperlinks, if (i) such webpages are not already in the process of being loaded by a different type of look-ahead function, such as described in FIG. 15 and FIG. 19;
(ii) the Network bandwidth has not become saturated; and
(iii) the computer processor has not become saturated. These webpages are not visible, but are immediately available to become visible and viewed upon demand.

FIG. 18 shows a flowchart for a possible sequence of events for Periodic Webpage Preloading with network and processor saturation avoidance. After a search on a Network has been initiated through an IRDS enhanced web browser, a list of hyperlinks to webpages may be returned from each search engine utilized and put into a hyperlink queue 1801. These hyperlinks point to webpages that may be distributed on a Network and may be on multiple websites. Periodic Webpage Preloading with network and processor saturation avoidance refers to a method where IRDS periodically searches the webpage queue for locations (i) that have old, inconsistent data, or no data 1804;
(ii) that are not being preloaded 1805 by another method;
(iii) when the network connection 1806 isn't saturated; and
(iv) when the computer processor 1807 local to the web browser isn't saturated.

Upon finding such an unloaded position in the webpage queue, the web browser is directed to preload 1808 one or more webpages. Such webpages are not visible, until the web browser needs to display the webpages. Specifically, after the hyperlink queue 1801 has been populated with the hyperlinks returned from the search engine(s), a set period of time is waited 1802 and then a position pointer in the webpage queue is incremented 1803. The new position 1804 in the webpage queue is checked for old webpage data, inconsistent webpage data, or no webpage data. If the webpage in the webpage queue has been preloaded and is the correct webpage pointed to by the associated hyperlink in the hyperlink queue, then the position pointer 1803 is incremented and the next position 1804 checked. If a webpage 1804 in the webpage queue hasn't been preloaded or isn't the correct webpage pointed to by the associated hyperlink in the hyperlink queue and isn't in the process of being preloaded 1805 by another method and the network 1806 isn't saturated and computer processor 1807 local to the web browser isn't saturated, then the web browser utilizes the hyperlink in the hyperlink queue to preload 1808 the webpage into the webpage queue. The process then goes to sleep for a set period of time 1802 and then repeats. If there is a preloading 1805 conflict or the network connection 1806 is saturated or the processor 1807 is saturated, the process goes to sleep for a set period of time 1802 and then repeats. If at any time, the end of the webpage queue is reached, the process is temporarily halted 1809. The waiting period and the number of webpages preloaded on each repetition can be adjusted according to available Network and processor bandwidth. The preloading process should not be detrimental to the user interacting with the currently displayed webpages.

FIG. 19 depicts an IRDS directed web browser Descendant Webpage Preloading method. Descendant pages 1906, 1907, and 1908 are pointed to by hyperlinks 1903, 1904, and 1905 respectively that reside on webpages that have already been preloaded into a webpage queue 1902 or computer memory. Descendant pages are preloaded into computer memory, a queue, or web browser 1901 objects that are not visible until requested by the web browser 1901 to be displayed on demand. A user selecting hyperlink 1903, 1904, or 1905 on a visible webpage would immediately have the descendant webpage 1906, 1907, or 1908 associated with such hyperlink 1903, 1904, or 1905 available and displayed.

FIG. 20 shows a flowchart and diagram for an IRDS enhanced web browser 2001 display function that is able to change the number of webpages 2005 displayed at a given time. The web browser 2001 command and control function 2002 includes icon 2003 that is selected 2004, or alternatively operated by rotating the computer Mouse wheel 2008 over icon 2003 to change the number of webpages 2005 displayed to a new preset number of webpages 2006. The Mouse wheel may be continually rotated or the icon continually reselected until the number of webpages displayed is satisfactory 2009, within the limitations of the number of display setting possibilities. In this example, the number of webpages displayed 2005 is changed from two (2) to four (4) webpages displayed 2006. The webpages, two 2005 or four 2006, are displayed simultaneously and are fully active webpages, that may be from different website domains. The icon 2003 may change appearance 2007 to indicate the current number of webpages displayed.

FIG. 21 shows a flowchart and diagram for an IRDS enhanced web browser 2101 including a zoom function to zoom in or out on any selected 2108 displayed webpage 2105 or group of webpages. The web browser 2101 command and control function 2102 includes zoom icon 2103 that is selected 2104, or alternatively operated by rotating the computer Mouse wheel 2109 over such icon 2103 to change the zoom factor for selected 2108 webpages 2105 displayed to a new zoom factor. The Mouse wheel may be continually rotated 2109 or the icon 2103 continually reselected 2109 until the zoom factor for the webpages 2106 displayed is satisfactory 2110, within the limitations of the number of display setting possibilities. In this example, the zoom factor for the selected webpage 2105 displayed is changed to zoom in and the resultant webpage 2106 displayed. The zoomed in webpage 2106 is displayed simultaneously with any non-zoomed webpages displayed and all displayed webpages are fully active webpages that may be from different website domains. The icon 2103 may change appearance 2107 to indicate the current zoom factor for the zoomed webpages 2106 displayed.

FIG. 22 shows a diagram for an IRDS enhanced multi-page web browser 2201 full display function 2203 to make the selected webpage 2205 encompass the entire screen area allotted for the multi-page display, which is equivalent to setting the number of website pages to display to one for such selected webpage 2205. Specifically, a webpage 2205 is selected from the all the webpages displayed and then the web browser 2201 command and control 2202 full display function 2203 is selected with a computer Mouse 2204 or other input device. The resultant webpage 2206 is displayed in the entire screen area allotted for the multi-page display.

FIG. 23 shows a diagram for an IRDS enhanced multi-page web browser 2301 mode function 2303 to make the selected webpage 2305 encompass the entire screen area allotted for the multi-page display and switch from an IRDS enhanced mode to a conventional web browser mode that displays and operates on one (1) webpage at a time. The mode function will switch between conventional web browser mode and IRDS enhanced web browser mode on each reselection. Specifically, a webpage 2305 is selected from the all the webpages displayed and then the web browser 2301 command and control 2302 mode function 2303 is selected 2304 with a computer Mouse or other input device. The resultant webpage 2306 is displayed in the entire screen area allotted for the multi-page display and has switched to a conventional web browser mode. The web browser icons and command and control display will change appearance accordingly to show the current web browser mode and available features and functions in such mode.

FIG. 24 shows a diagram for an IRDS enhanced multi-page web browser 2401 imaging function 2403 that takes a selected portion 2405 of a web browser display and creates an image 2406 in a standard image format, such as Joint Photography Experts Group ("JPEG"), Graphics Interchange Format ("GIF"), or bitmapped ("BMP"). The selected portion of the web browser display can be any portion of the web browser display including, but not limited to, crossing multiple webpage display boundaries. Specifically, a portion 2405 of a web browser display is selected and then the web browser 2401 command and control 2402 imaging function 2403 is selected 2404 with a computer Mouse or other input device. The created image 2406 may be displayed and/or saved as a file to physical media (hard drive, floppy drive, compact disk, etc) or computer memory or copied to another computer application, such as a word processor, spreadsheet, or presentation program.

FIG. 25 shows a diagram for an IRDS enhanced multi-page web browser 2501 remove webpage function 2503 to remove selected 2505 webpages from the multi-page display and/or webpage queue 2509 and/or the associated hyperlinks from the hyperlink queue. Specifically, a webpage(s) 2505 is selected from the displayed webpages. The web browser 2501 command and control 2502 remove webpage function 2503 is selected with a computer Mouse 2504 or other input device. The resultant web browser display replaces the selected webpage 2505 with the webpage 2506 immediately following in the webpage queue. All webpages in the webpage queue following the removed webpage 2505 are decremented one position, such that webpage n+2 moves into webpage n+1's display position and webpage n+3 moves into webpage n+2's display position and webpage n+4 moves into webpage n+3's display position. Any displayed webpages will immediately reflect the new webpage queue ordering. Alternately, a webpage from the webpage queue may replace the deleted page or the deleted page may be left blank, while the other webpages currently displayed may stay in their current positions.

FIG. 26 shows a diagram for an IRDS enhanced multi-page web browser 2601 group bookmarking function 2603 to bookmark selected hyperlinks 2605 or all the hyperlinks from the hyperlink queue. A conventional web browser allows a hyperlinked bookmark to be saved for one (1) webpage at a time. An IRDS enhancement would allow multiple hyperlinks 2605 associated with a hyperlink queue to be saved as a group bookmark 2606. This group bookmark 2606 could be recalled later to reload the hyperlink queue and subsequently reload the associated webpages into the webpage queue. This would retrieve and display an updated state of a search without performing a search. Hence, if the associated webpages had changed between an initial search and recalling the webpages with a group bookmark reload, the recalled version would reflect any updated webpage information. Specifically, hyperlinks 2605 from a hyperlink queue or portion thereof is selected and then the web browser 2601 command and control 2602 group bookmark function 2603 is selected with a computer Mouse 2604 or other input device. These selected hyperlinks 2605 are saved as a group bookmark 2606. This group bookmark 2606 can be recalled later to reload the hyperlink queue and subsequently reload the associated webpages into the webpage queue for web browser display.

FIG. 27 shows a diagram associated with selecting any portion of a webpage queue 2701, whether or not displayed by an IRDS enhanced web browser and saving such webpages to an alternate webpage set 2702 or queue. One or more such alternate sets 2702 could be made the active display set upon demand. During an information search and review process it would be advantageous to move selected pages to an alternate set for later review or group bookmarking. In this way, multiple searches could take place and only the useful webpages kept for review. Multiple alternate sets or queues would be available to enable grouping of selected webpages from multiple searches into like categories or by criteria set by the user. Group bookmarking would be available for each alternate set or queue.

Therefore, methods and apparatus for implementing an Information Retrieval and Display System, have been described.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A method for retrieving and viewing webpages in a single web browser instance operating on a user's computer, comprising the sequential steps of:
    submitting, from said single web browser, a search request to an Internet search engine located on the Internet, wherein said search request is initiated by the user
    receiving a hyperlink list from said Internet search engine, said hyperlink list having been automatically rank-ordered by said Internet search engine, and wherein said hyperlink list by default is not displayed;
    automatically preloading a plurality of webpages referred to by said hyperlink list to form a rank-ordered queue of webpages stored on the user's computer;
    viewing at least two webpages from said rank-ordered queue of webpages in separate windows within said single web browser instance such that all of said at least two webpages are fully active and simultaneously visible, and where any of said at least two webpages may be operated on without altering the state of another of said at least two webpages; and
    wherein descendant webpages are preloaded for some, but not all, of said at least two webpages.

2. The method of claim 1 including changing the number of webpages that are simultaneously displayed according to an input from the user and when additional webpages are made visible, populating these additional webpages automatically with webpages corresponding to hyperlinks in said rank-ordered list of hyperlinks.

3. The method of claim 1 including selectively deleting webpages displayed or queued for display.

4. The method of claim 1 where said loading is accomplished by preloading a selectable number of webpages corresponding to a selectable number of hyperlinks in the queue of hyperlinks.

5. The method of claim 1 including changing the number of webpages that are simultaneously displayed according to an input from the user.

6. The method of claim 1 including selectively saving the queue of hyperlinks or a portion thereof as a group bookmark hyperlink list that may be loaded in a web browser at a later time.

7. The method of claim 1 where said loading is further accomplished by concurrently preloading a predetermined number of webpages pointed to by hyperlinks in the queue of hyperlinks.

8. The method of claim 1 where said loading is further accomplished by determining the available network download bandwidth and preloading a predetermined number of webpages based on such available network download bandwidth.

9. The method of claim 1 where said loading is further accomplished by:
    determining that a processor within the user's computer isn't saturated; and
    preloading a predetermined number of webpages based on the processor's non-saturation state.

10. The method of claim 1 including selectively deleting webpages displayed or queued for display.

11. A method for retrieving and viewing webpages in a single web browser instance operating on a user's computer, comprising the sequential steps of:
    simultaneously submitting, from said web browser, a search request to multiple Internet search engines located on the Internet, and wherein said search request is initiated by the user
    receiving a hyperlink list from each of said multiple Internet search engines, said hyperlink list having been automatically rank-ordered by the Internet search engine that supplied said hyperlink list;
    automatically forming a single queue of hyperlinks from all hyperlink lists received by aggregating or prioritizing hyperlinks from said hyperlink lists;
    automatically loading a plurality of webpages referred to by said single queue of hyperlinks to form a queue of webpages stored on the user's computer; and
    viewing at least two webpages from said queue of webpages in separate windows within the single web browser instance such that all of said at least two webpages are fully active and simultaneously visible, and where any of said at least two webpages may be operated on without altering the state of another of said at least two webpages.

12. The method of claim 11 where said loading is accomplished by preloading a selectable number of webpages pointed to by a selectable number of hyperlinks in the list of hyperlinks, and wherein descendant are preloaded for some, but not all, of said selectable number of webpages.

13. The method of claim 11 where said loading is further accomplished by concurrently preloading a predetermined number of webpages pointed to by hyperlinks in the list of hyperlinks, and wherein descendant webpages are preloaded for some, but not all, of said predetermined number of webpages.

14. The method of claim 11 where said loading is accomplished by determining an available network download bandwidth and preloading a predetermined number of webpages based on such available network download bandwidth.

15. The method of claim 11 where said loading is further accomplished by:
 determining that a processor within the user's computer isn't saturated; and
 preloading a predetermined number of webpages based on the processor's non-saturation state.

16. The method of claim 11 including selectively saving the rank-ordered queue of hyperlinks or a portion thereof as a group bookmark hyperlink list that may be loaded in a web browser at a later time.

17. The method of claim 11 where viewing said webpages includes displaying at least two additional fully functional webpages in said single web browser instance at the same time such that all of said at least two additional fully functional webpages are simultaneously visible to the user and may be operated on simultaneously, and where any of said at least two additional fully functional webpages may be operated on without altering the state of another of said at least two additional fully functional webpages.

18. The method of claim 11 including selectively saving the queue of hyperlinks or a portion thereof as a group bookmark hyperlink list that may be loaded in a web browser at a later time.

\* \* \* \* \*